(12) United States Patent
Harrington

(10) Patent No.: US 11,702,885 B1
(45) Date of Patent: *Jul. 18, 2023

(54) SECURABLE PET DOOR

(71) Applicant: Lisa Harrington, Somerville, MA (US)

(72) Inventor: Lisa Harrington, Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,608

(22) Filed: Sep. 19, 2022

Related U.S. Application Data

(63) Continuation-in-part of application No. 17/836,942, filed on Jun. 9, 2022, now abandoned.

(51) Int. Cl.
| | |
|---|---|
| *E05F 15/00* | (2015.01) |
| *E06B 7/32* | (2006.01) |
| *A01K 29/00* | (2006.01) |
| *E06B 1/52* | (2006.01) |
| *E05B 47/00* | (2006.01) |
| *E05F 15/73* | (2015.01) |
| *E05D 11/10* | (2006.01) |
| *E05D 7/10* | (2006.01) |

(52) U.S. Cl.
CPC ............ *E06B 7/32* (2013.01); *A01K 29/00* (2013.01); *E05B 47/0038* (2013.01); *E05D 7/1044* (2013.01); *E05D 11/1028* (2013.01); *E05F 15/73* (2015.01); *E06B 1/52* (2013.01); *E05Y 2400/856* (2013.01); *E05Y 2900/132* (2013.01)

(58) Field of Classification Search
CPC .......... E06B 7/32; E06B 1/52; E05B 47/0038; E05F 15/73; E05D 7/1044; E05D 11/1028; E05Y 2400/856; E05Y 2900/132; A01K 29/00

See application file for complete search history.

(56) References Cited

U.S. PATENT DOCUMENTS

| | | | |
|---|---|---|---|
| 2,758,646 A | 8/1956 | Johnson | |
| 3,184,803 A | 5/1965 | Peel | |
| 4,430,836 A | 2/1984 | McKann | |
| 4,760,872 A | 8/1988 | Hale, Jr. | |
| 4,776,133 A | 10/1988 | Green | |
| 5,269,097 A | 12/1993 | Davlantes | |
| 5,406,748 A | 4/1995 | Davlantes | |
| 5,535,804 A * | 7/1996 | Guest | E06B 7/32 |
| | | | 160/180 |
| 5,735,079 A | 4/1998 | Davlantes | |
| 6,385,909 B1 | 5/2002 | Marsh | |

(Continued)

FOREIGN PATENT DOCUMENTS

CN 113006669 A 6/2021

*Primary Examiner* — Chi Q Nguyen
(74) *Attorney, Agent, or Firm* — Camille A. Wilson; Wilson Dutra, PLLC

(57) ABSTRACT

An interchangeable pet door is disclosed. The interchangeable pet door comprises a door, a knob, a plurality of windows, a frame, and a hinge. The knob comprises a latch for securely closing the door. When the interchangeable pet door comprises a hinge, inserting the hinge into a hinge recess securely locks the door. The different elements of the interchangeable pet door are configured to be oriented in a predetermined, interchangeable, or customizable manner. The door is configured to open from, slide into, revolve within, or move in some other non-limiting equivalent way from or relative to a frame.

20 Claims, 21 Drawing Sheets

(56) References Cited

U.S. PATENT DOCUMENTS

| | | | |
|---|---|---|---|
| 7,913,454 B2* | 3/2011 | Sullivan | E06B 7/32 |
| | | | 160/180 |
| 8,074,606 B1 | 12/2011 | Schrey | |
| 8,484,896 B1* | 7/2013 | Skubiak, Jr. | E06B 9/52 |
| | | | 160/369 |
| 8,567,137 B2 | 10/2013 | Sullivan | |
| 8,826,594 B2 | 9/2014 | Graves | |
| 11,384,595 B1* | 7/2022 | Harrington | E06B 1/526 |
| 2006/0179719 A1* | 8/2006 | Christie | E06B 7/32 |
| | | | 49/169 |
| 2006/0242908 A1* | 11/2006 | McKinney | E05F 15/73 |
| | | | 49/280 |
| 2014/0033639 A1* | 2/2014 | Walther | E06B 1/52 |
| | | | 52/745.16 |
| 2019/0098874 A1* | 4/2019 | Burton | A01K 29/005 |
| 2019/0203527 A1* | 7/2019 | Stricklin | E06B 7/32 |
| 2021/0144956 A1* | 5/2021 | Bohannon | A01K 27/001 |

* cited by examiner

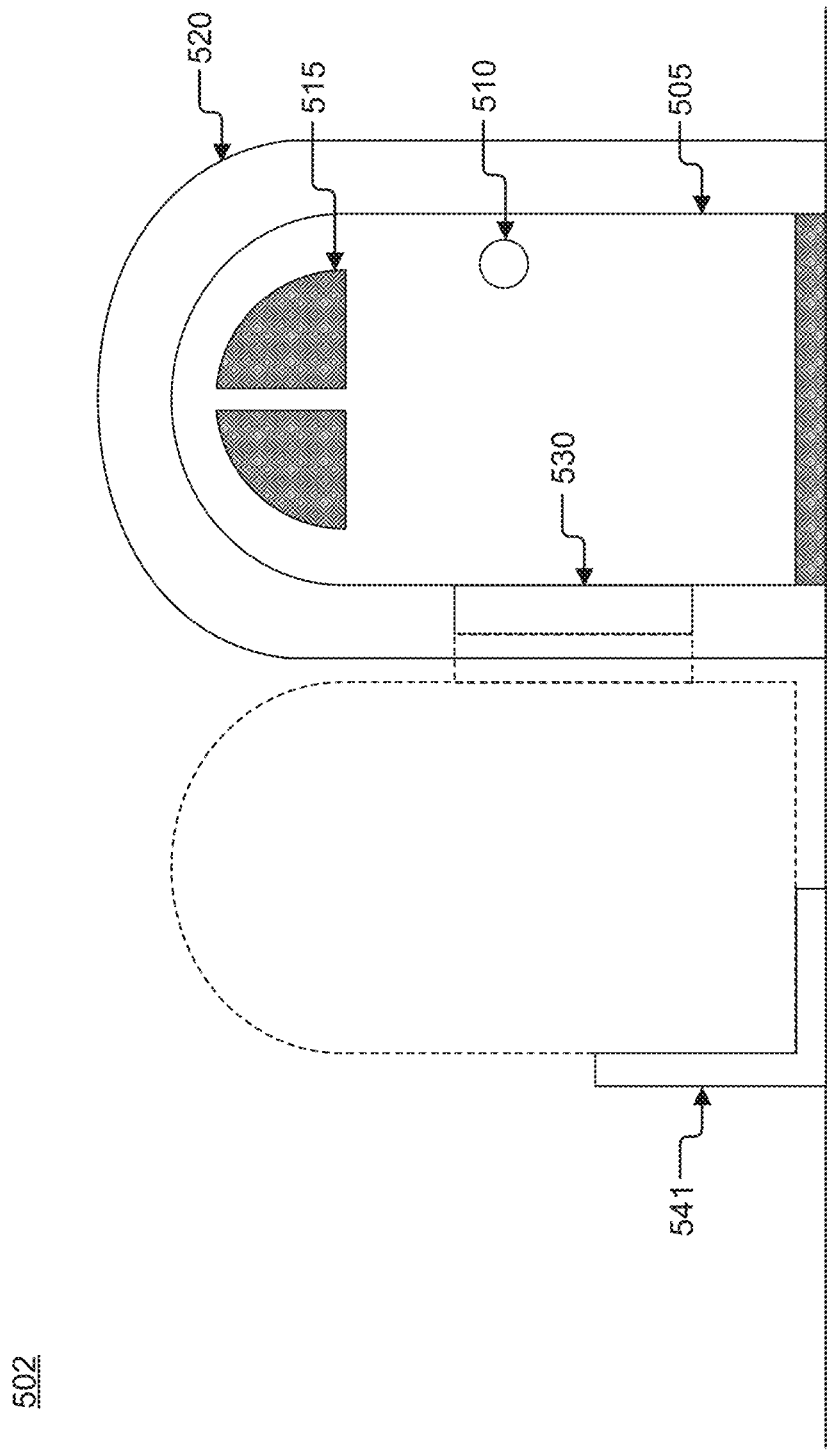

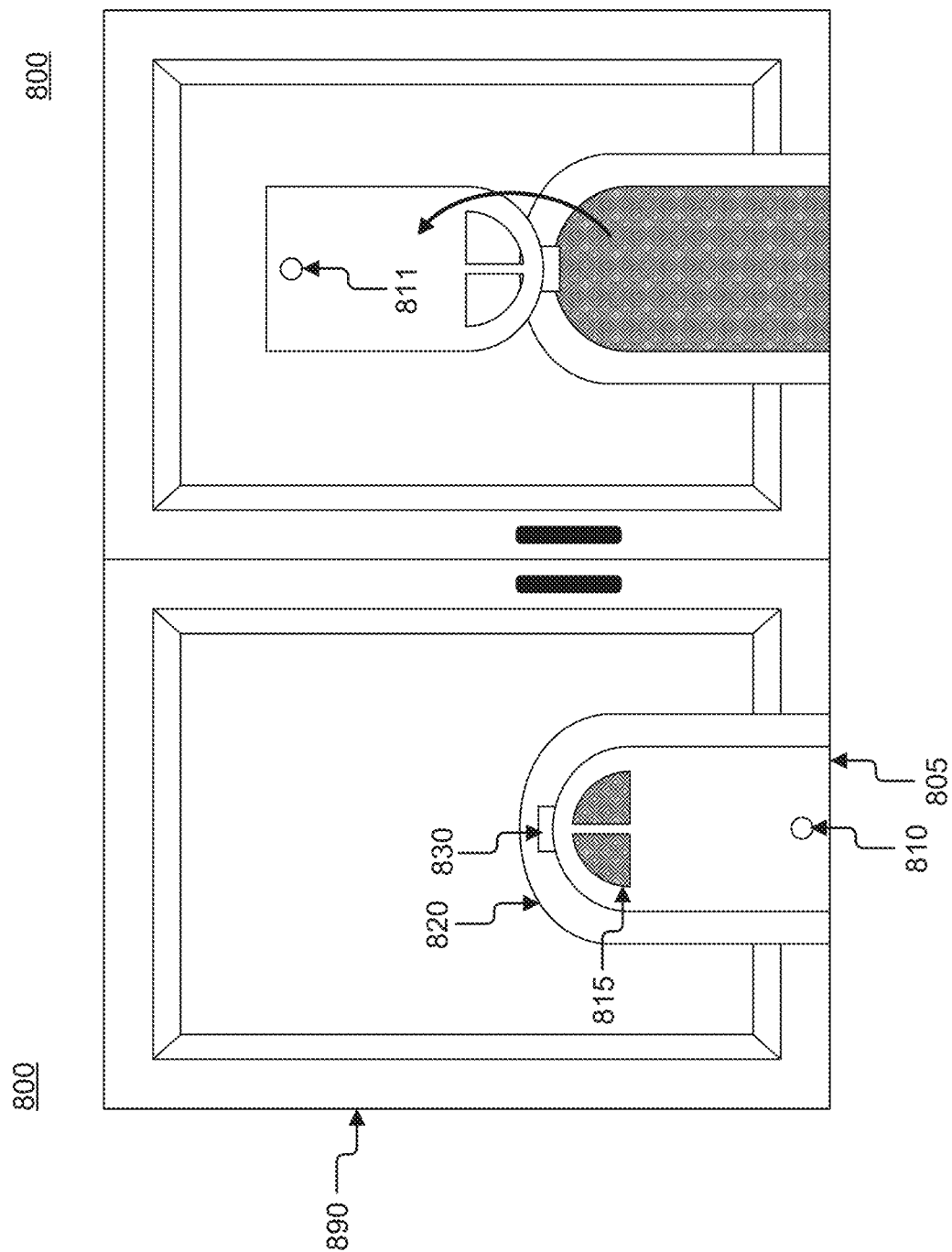

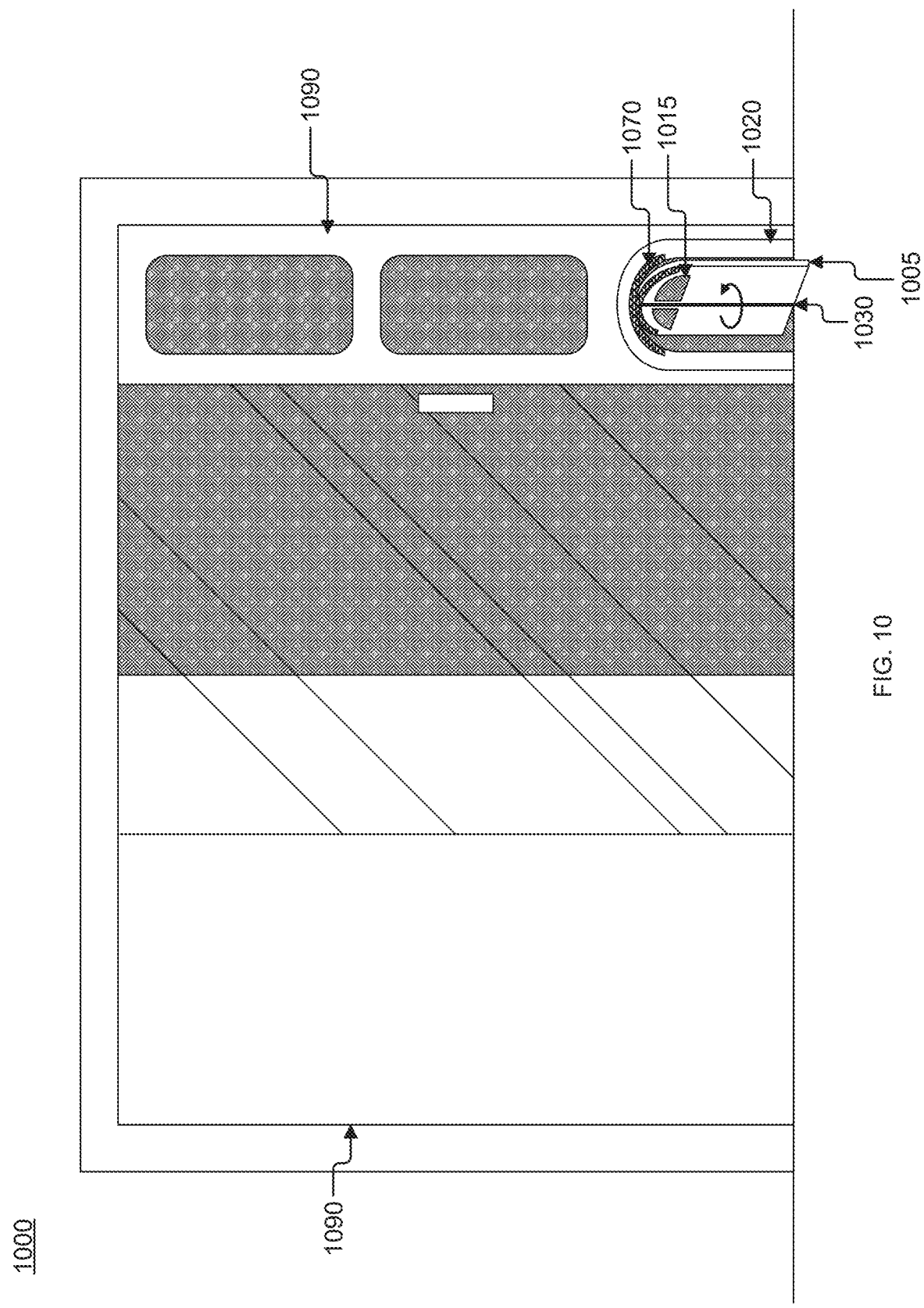

SECURABLE PET DOOR

CROSS-REFERENCE TO RELATED APPLICATION

This application is a continuation of and claims priority to U.S. Non-provisional patent application Ser. No. 17/836,942 (filed Jun. 9, 2022, and titled "SECURABLE PET DOOR"), which was a continuation in part of and claimed priority to U.S. Non-provisional patent application Ser. No. 17/486,068 (filed Sep. 27, 2021, and titled "SECURABLE PET DOOR"), the entire contents of which are incorporated herein by reference.

BACKGROUND

Doors are pathways to new places and spaces. Passing through a door may also allow a homeowner to get from one room of the house to another, or a professional to pass between rooms in an office. Passing through a door allows a traveler to leave a known area and venture into an unknown one. Equally as important, doors can be locked, offering security to the spaces they help define. An open door often implies a welcoming environment, while a closed door implies a desired environment of privacy or even secrecy.

Doors come in a variety of shapes and sizes, to accommodate different kinds of travelers. Some are plain, some are decorated with ornate detail. A common festivity around the world is to seasonally decorate doors to celebrate sports teams, holidays, and other miscellaneous celebrations. Many doors can be replaced when after they accumulate significant wear and tear. Some doors have windows, are completely transparent, or can be incrementally opened, such as a Dutch door. Many doors open and close manually, but other doors may do these actions automatically, with the help of an activation button or motion sensor. However, these features are often lacking, if not completely absent, from the market for pet doors.

Pet doors are often used internally and externally to help pet owners control how their pets navigate within and into or out of their homes. Pet doors may connect the inside of a home to the external elements, or may simply connect one room of a home to another. Due to their nature, pet doors are often hard to control once installed. The true users of pet doors are animals, who are unaware of proper door etiquette such as ensuring an exterior door is completely closed, so as to prevent a way of entry for bad actors or the elements.

Typically, once they are installed, pet doors are hard to maintain, secure, and customize. Most pet doors available in the market today add to the amount of dirt being tracked into the home, do not completely close, and cannot be completely secured. As a result, pet owners who utilize pet doors often clean the area surrounding the installation area more, relying on third party equipment to close and secure the door when not in use, and needing to remember to subsequently remove any securing devices when the door is actually be used by a pet. Interior pet doors are often used to control a pet's access to certain areas inside the house. Furthermore, since most pet doors are manually operated, should a pet door get stuck or break, the pet may be either deterred from further use or be injured in the process.

SUMMARY OF THE DISCLOSURE

What is needed is an installable, customizable, and securable pet door. The pet door may resemble a standard human door, with a knob, hinge, and windows, as non-limiting examples. In some embodiments, the knob may comprise a latch for secure closing. When the pet door comprises a hinge, the hinge may be inserted into a hinge recess so that the door may be securely locked in an open position. This removes the need to turn to third party locking mechanisms or systems to safely secure the pet door. In some implementations, the pet door may include a sliding mechanism to insert itself into a frame. In some implementations, the orientation of the knob to the door, the door to the frame, the hinge to the door and the frame, and the plurality of windows to the door may be predetermined or customizable. Having the ability to choose how these elements fit together, and even the option to change them later, allows the pet owner to truly customize the pet door system for their needs.

In some implementations, the door may be open from, slide into, open up and out of, revolve within, or move in some other non-limiting equivalent way from or relative to the frame. The knob or door, or both, may be interchangeable within the pet door system. For example, the door may be replaced with a seasonal door during the relevant holiday or season. This would allow the pet owner to include the pet door system in the overall design and feel of their home, as opposed to being stuck with a pet door that may amount to no more than an eye sore.

In some aspects, the frame may comprise a sensor. When the frame comprises a sensor, the sensor may interface with an external device, such as a doormat, to open and close the door automatically as a result of a change in motion, temperature, or other non-limiting sensible feature or method. The sensor may work in tandem with or separately from, or some combination thereof, with the external device to detect a pet's presence and open or close the door, accordingly. This would enable the pet door system to be semi-automatic and responsive to the actions and presence of a pet, not just a pet owner. Pets would be able to operate this door themselves, without the aforementioned cleanliness and security repercussions. For example, the pet door may securely lock once the sensor no longer detects a pet trying to pass through.

The present disclosure relates to a pet door that may include a first frame, where the first frame may be configured to partially embed within a first external surface; a hinge, where the hinge may be configured to pivot along a pivot axis defined by the first frame; a door, where at least one edge connects to the hinge; a knob, where the knob may be attached to a surface of the door. In some embodiments, the pet door includes a latch, where the latch extends from a rotational axis of the knob and interfaces with the first frame; a first connector frame extending from the first frame, where the first connector frame may be configured to be fully embedded within the first external surface; a second frame, where the second frame may be configured to partially embed within a second external surface, where when the first frame and the second frame are embedded, a portal from the first external surface to the second external surface may be created; and a second connector frame extending from the second frame, where the second connector frame may be connectable on a distal end to the first connector frame, and where when connected, the second connector frame may be configured to be fully embedded within the second external surface.

In some implementations, the pet door where the first frame may comprise a hinge recess that secures the hinge in a plurality of predetermined positions. In some aspects, the door may be secured in a fixed position by a door stopper. In some embodiments, the door stopper may be attached to the first external surface and interfaces with a door edge. In some implementations, the door stopper may be attached to the first external surface and interfaces with the knob.

In some aspects, the door stopper may be part of the first frame and interfaces with a door edge. In some embodiments, the door stopper may be part of the door and interfaces with a recess in the first frame. In some implementations, the frame may comprise a latch receiver configured to receive a latch extending from the door. In some aspects, the latch receiver may be internal to the first frame. In some embodiments, the latch receiver may be external and attached to the first frame. In some implementations, the door extends into a region between the first external surface and the second external surface. In some aspects, the first frame or second frame, or both, may comprise a sensor. In some embodiments, the sensor interacts with an external device. In some implementations, the first external surface may comprise a panel insertable proximate to a sliding glass door.

The present disclosure relates to a pet door that may include a first recessed frame, where the first recessed frame may be configured to recess into a first external surface; a first hinge, where the hinge pivots along a pivot ax may be defined by a first side of the first recessed frame; a first door, where at least one edge connects to the first hinge; a first knob, where the first knob may be attached to a surface of the first door. In some aspects, the pet door includes a second hinge, where the hinge pivots along a pivot ax may be defined by a second side of the first recessed frame; a second door, where at least one edge connects to the first hinge. In some embodiments, the pet door includes a second knob, where the second knob may be attached to a surface of the second door; a first connector frame, where the first connector frame may be attached to the first recessed frame; a second connector frame, where the second connector frame may be configured to connect to the first connector frame; and a second recessed frame configured to recess into a second external surface, where the second frame extends distally from the second connector frame and where when the first frame and the second frame are recessed, a portal from the first external surface to the second external surface may be created.

In some implementations, the pet door may comprise a locking mechanism. In some aspects, the locking mechanism may comprise a latching mechanism located on the first knob and a positioning mechanism located proximate to the second knob, where the positioning mechanism may be configured to limit a position of the latching mechanism, and where the latching mechanism may be configured to fit over the second knob when in a locked position. In some embodiments, the first door and the second door extend into a region between the first external surface and the second external surface. In some implementations, the first frame or the second frame, or both, may comprise magnets for retaining one or both the first door and the second door in a fixed position. In some aspects, the external device controls a position of one or both the first door and the second door.

BRIEF DESCRIPTION OF THE DRAWINGS

The accompanying drawings that are incorporated in and constitute a part of this specification illustrate several embodiments of the disclosure and, together with the description, serve to explain the principles of the disclosure:

FIG. 5E illustrates an exemplary pet door with an external door stopper, according to some embodiments of the present disclosure.

FIG. 8A illustrates an exemplary pet door, according to some embodiments of the present disclosure.

FIG. 8B illustrates an exemplary pet door, according to some embodiments of the present disclosure.

FIG. 10 illustrates an exemplary pet door, according to some embodiments of the present disclosure.

DETAILED DESCRIPTION

The present disclosure provides generally for an installable, customizable, and securable pet door. According to the present disclosure, the pet door may comprise a door, a knob, a plurality of windows, a frame, and a hinge.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

GLOSSARY

Knob: as used herein, refers to any kind of appendage that can be fixed on a door and turned, pulled, pushed, or moved in another non-limiting way to open and close the door. The knob may comprise a generic doorknob or any kind of handle, point, grip, sliding mechanism, or other non-limiting equivalent.

The present disclosure describes an installable, customizable, and securable pet door. In some embodiments, the pet door may comprise a door, a knob, a plurality of windows, a frame, a hinge, a latch, a sensor, and other non-limiting features that may allow the pet door system to operate semi-automatically, securely open and close, and be better suited for safe use by a pet.

Figure 1:
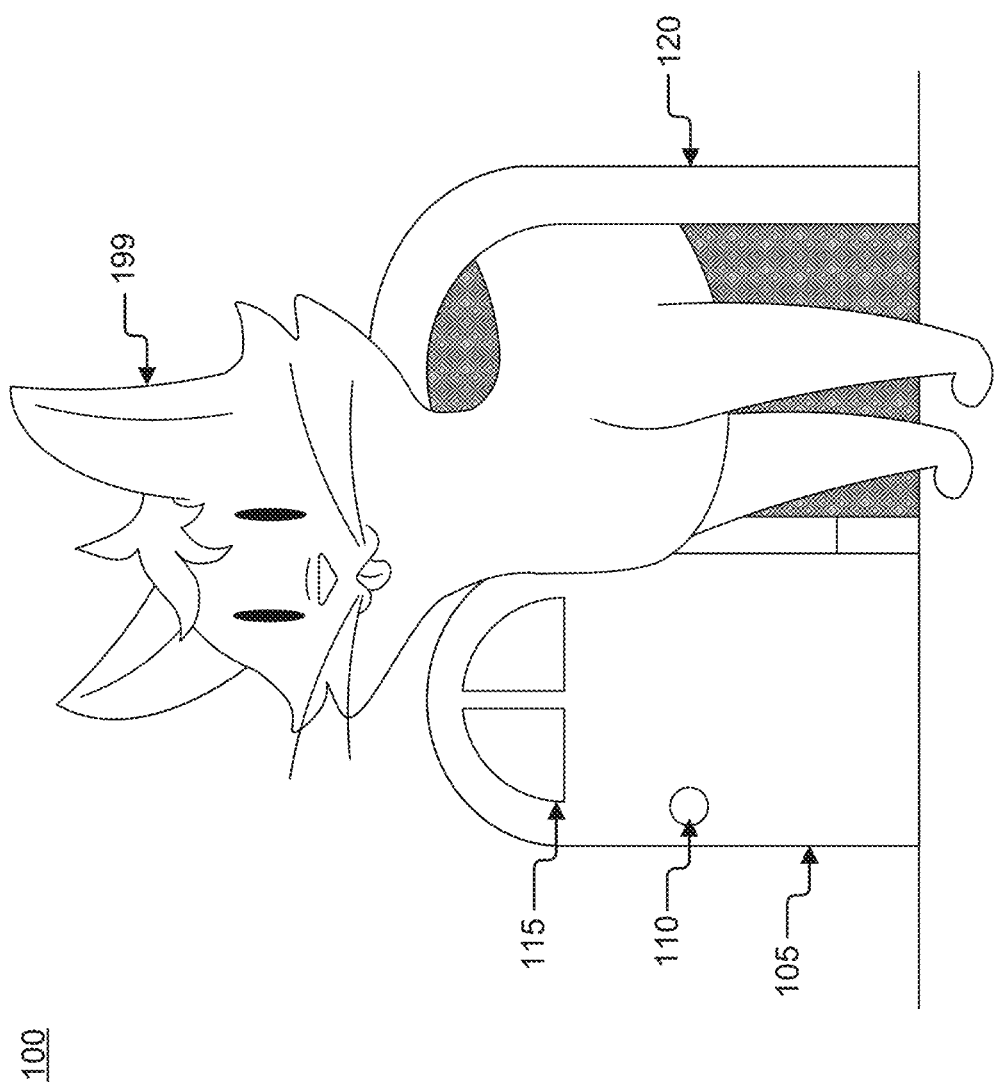
FIG. 1 illustrates a pet travelling through an exemplary pet door, according to some embodiments of the present disclosure.

Referring now to FIG. 1, an exemplary pet door 100 is illustrated. In some embodiments, the pet door 100 may comprise a door 105, a knob 110, a window 115, and a frame 120. In some implementations, the pet door 100 may be used to travel between two spaces separated by a barrier, such as a wall or door, by a pet 199. In some aspects, the pet 199 may be a large or small feline, canine, or other non-limiting examples.

In some embodiments, the door 105 may comprise plastic, vinyl, wooden, carpet, metallic, textured, hook-and-loop, or other non-limiting equivalent material. In some implementations, the door 105 may be customizable to match or complement the exterior or interior design of the pet 199 owner's home or room. For example, the door 105 may comprise a material that allows seasonal decorations to be added or removed from the door 105. In some aspects, the door 105 may also be interchangeable, so the pet 199 owner has more than one option to choose from to match or complement the surrounding decor. This ability to alter the pet door 100 allows the pet 199 owner to fully incorporate the pet door 100 into their home.

In some implementations, the knob 110 may resemble a generic doorknob, handle, bar, grip, fixture, or other non-limiting examples. The knob 110 may enable the pet 199 owner to securely close the pet door 100 when not in use. In some embodiments, the knob may enable the pet 199 owner to open the pet door 100 with ease, as opposed to having to apply pressure to the pet door 100 itself, which may damage the pet door 100 if too much force is applied.

For example, the knob 110 may turn, push in and out, slide, or be static. In some embodiments, the knob 110 may comprise the same or a different material than the door 105. In some aspects, the knob 110 may be interchangeable or removed entirely, depending on the pet 199 owner's preference.

In some embodiments, the window 115 may comprise a pane of glass, pane of plastic, pane of vinyl, some other non-limiting equivalent, or simply be an opening in the door 105. For example, the window 115 may comprise one pane or a plurality of panes. In some aspects, the window 115 may allow the pet 199 owner to see through the pet door 100 if it is securely closed. For example, the pet 199 may want to reenter the home through an exterior pet door 100. The window 115 would enable the pet 199 owner to keep the exterior pet door 100 closed while the pet 199 is not traveling through the door 105 and see the pet 199 waiting outside of the closed door 105. In some embodiments, the window 115 may provide a barrier from external particles, dust, dirt, and other non-limiting examples from entering the interior of the passageway. The barrier may prevent tracking in dirt that is common with other pet doors.

In some implementations, the door 105 may comprise more than one window 115. For example, there may be a plurality of windows 115 at the top, near the bottom, along a side, or variably placed throughout the door 105, as non-limiting examples. In some aspects, the window 115 may comprise a material that is translucent, frosted, textured, or some other non-limiting equivalent.

In some embodiments, the frame 120 may comprise the same or a different material than the door 105, the knob 110, the window 115, or some combination thereof. In some implementations, the frame 120 may align with the shape of the door 105. In other aspects, the frame 120 may comprise a different shape than the door 105. In some aspects, the frame 120 may insert into an exterior or interior wall or door so the pet door 100 may be used by a pet 199.

In some embodiments, the frame 120 may comprise an appendage or nodule that allows the door 105 to be secured in place, whether in a closed, completely open, or partially open position, to either the frame 120 or the wall the pet door 100 is inserted into. In other implementations, the frame 120 may comprise an extrusion that may prevent the door 105 from swinging in multiple directions within the frame 120.

For example, for an exterior pet door 100, the door 105 may be limited to only swinging inside as opposed to outside by and within the frame 120. In some embodiments, this limit in the range of the door 105 may assist in aligning the latch of the door 105 to the corresponding slot in the frame. This may be a critical assistance when the latch and corresponding slot are sufficiently small to impede normal manual alignment. In some aspects, the frame 120 may allow the door 105 to open and close in multiple directions.

Figure 2:
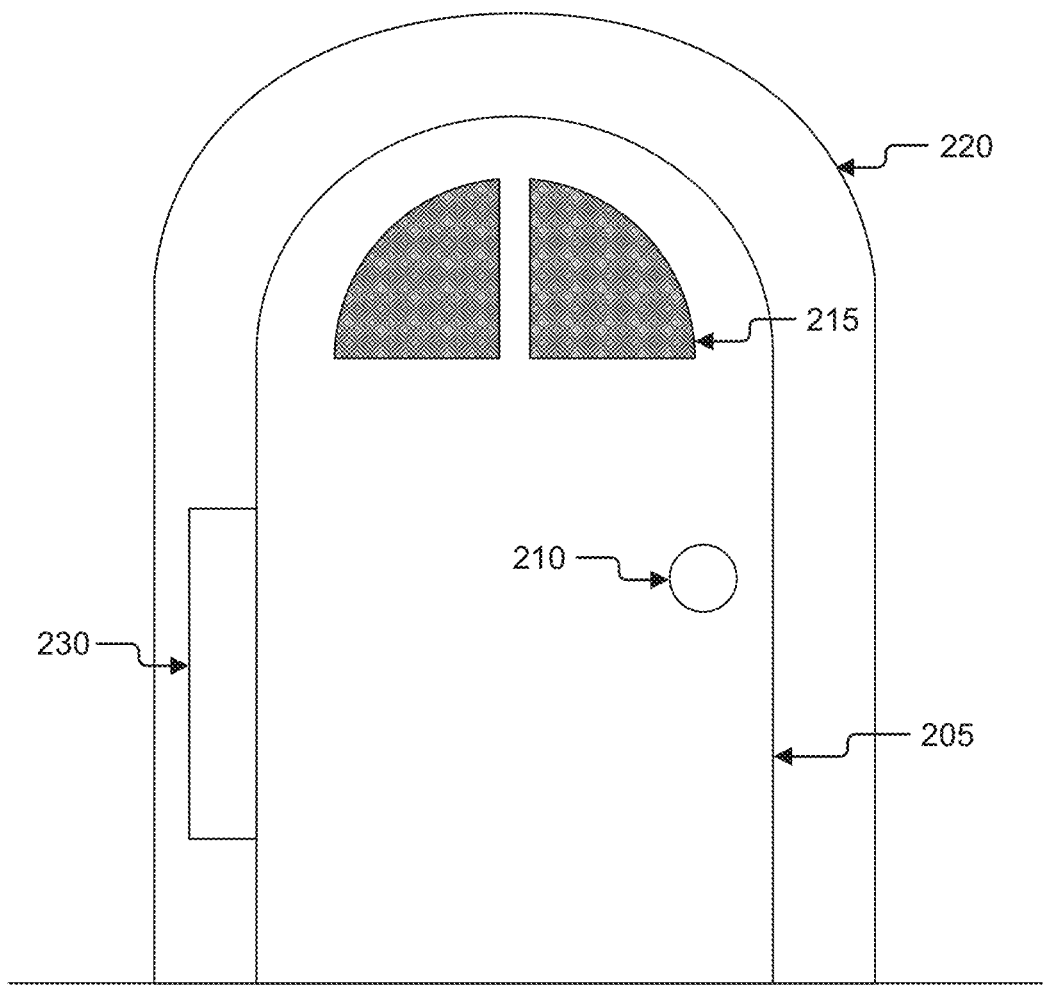
FIG. 2 illustrates a front view of an exemplary pet door, according to some embodiments of the present disclosure.

Referring now to FIG. 2, a front view of an exemplary pet door is illustrated. In some embodiments, the pet door 200 may comprise a door 205 and a knob 210. In some implementations, the pet door 200 may comprise a plurality of windows 215, a frame 220, and a hinge 230. In some aspects, the hinge 230 may couple to the door 205 and the frame 220, so the door 205 may open and close.

In some embodiments, the hinge may comprise a strap hinge, butt hinge, spring-loaded hinge, concealed hinge, piano hinge, offset hinge, overlay hinge, hidden barrel hinge, scissor hinge, gate hinge, or other non-limiting equivalents. In some implementations, the hinge 230 may be removeable, so a pet owner may customize the orientation and opening of the door 205. This may allow the pet owner to reuse the pet door 200 in a plurality of locations.

For example, if the pet owner purchased the pet door 200 while living in one house and then moved to another, the pet owner may need to adjust the orientation of the components of the pet door 200 in order to better suit the new space. In some aspects, the hinge 230 may be exposed or concealed by either the door 205 or frame 220, or both. The hinge 230 may allow the door 205 to be secured in a closed, completely open, or partially opened position, depending on the needs of the pet and the pet owner.

Figure 3:
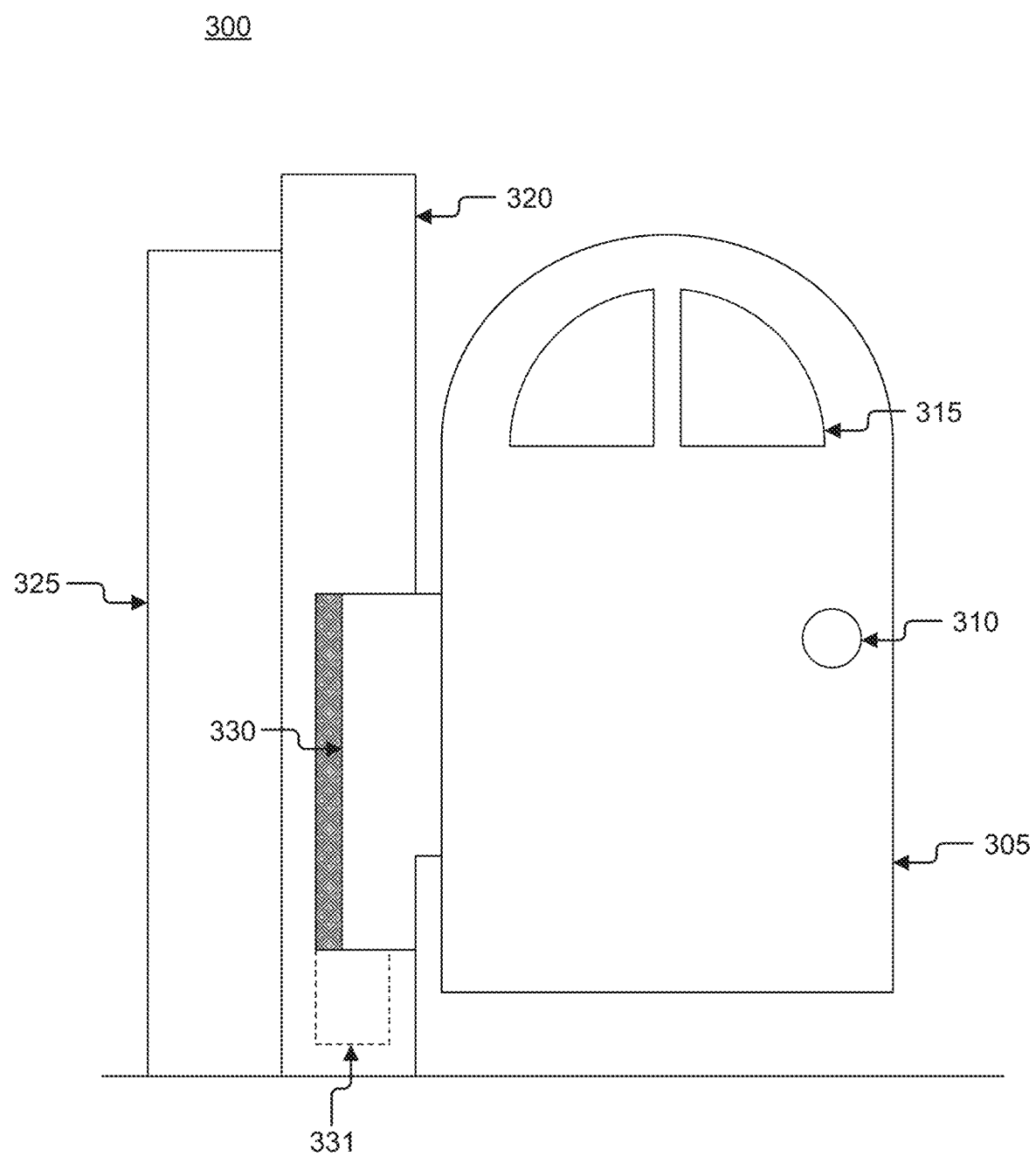
FIG. 3 illustrates a side view of an exemplary pet door, according to some embodiments of the present disclosure.

Referring now to FIG. 3, a side view of an exemplary pet door is illustrated. In some aspects, the pet door 300 may comprise a door 305. In some embodiments, the pet door 300 may comprise a knob 310. In other implementations, the pet door 300 may comprise a plurality of windows 315. In some embodiments, the pet door 300 may comprise a frame 320, a recessed frame 325 coupled to the frame 320, and a hinge 330. In some implementations, the frame 320 may comprise a hinge recess 331. The hinge 330 may insert into the hinge recess 331 to secure the door 305 in an open position. In some implementations, the hinge recess 331 may be housed within the frame 320.

For example, a pet owner may wish to keep the door 305 securely ajar. In some aspects, the door 305 may begin in a closed position, aligned with the frame 320. When opened, the door 305 may be pushed toward the frame 320, prompting the hinge 330 to align with and insert into the hinge recess 331.

In this example, to open and close the door and not keep it in a particular fixed position, the pet owner may have to perform an additional securing motion to prevent the door 305 from accidently clicking into a fixed position. This additional securing motion may involve lifting the door 305 up so that the hinge 330 uncouples from or misaligns with the hinge recess 331. In some embodiments, the hinge recess 331 may be accessed at only one or a plurality of open positions. In some aspects, the hinge 330 and hinge recess 331 may be oriented vertically, as shown, or horizontally.

In some embodiments, the recessed frame 325 is coupled to the frame 320, providing stability when inserted into an exterior or interior wall or door for use. The recessed frame 325 may be the same or different size or shape from the frame 320 or door 305. In some implementations, the recessed frame 325 comprises the same or a different material from the frame 320 or the door 305. The recessed frame 325 may prevent tails or pet hair from being caught in the hollow cavity that may otherwise be exposed between the outer panels of a wall or door, allowing for safe, pain-free passage of the pet through the pet door 300. The recessed frame 325 may also allow for a snugger fit when the pet door 300 is installed.

Figure 4B:
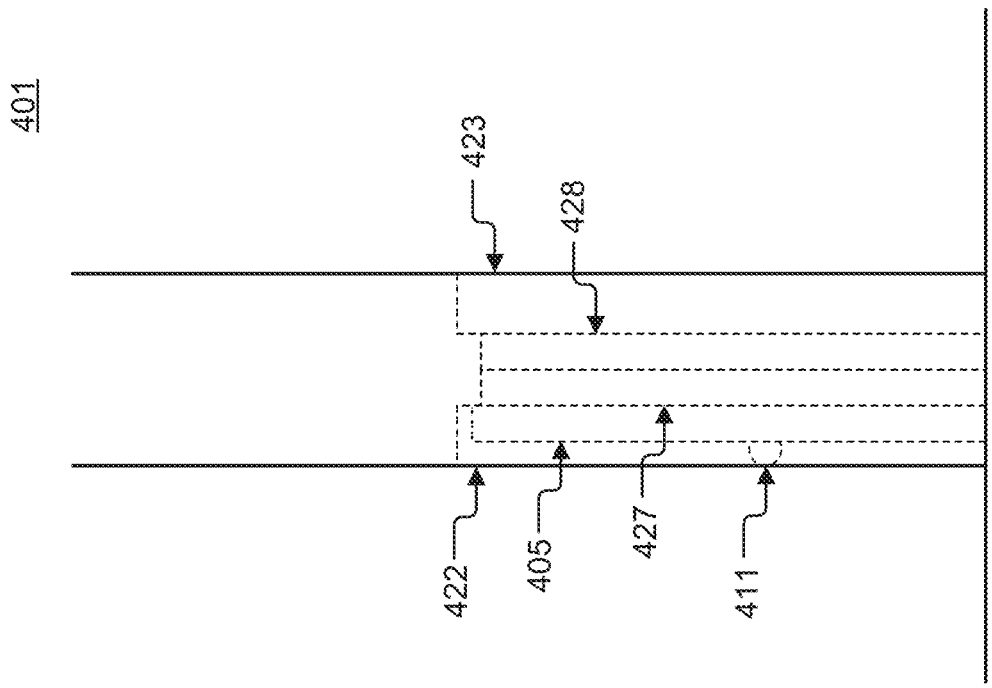
FIG. 4B illustrates a side view of an installed exemplary pet door, according to some embodiments of the present disclosure.
Figure 4A:
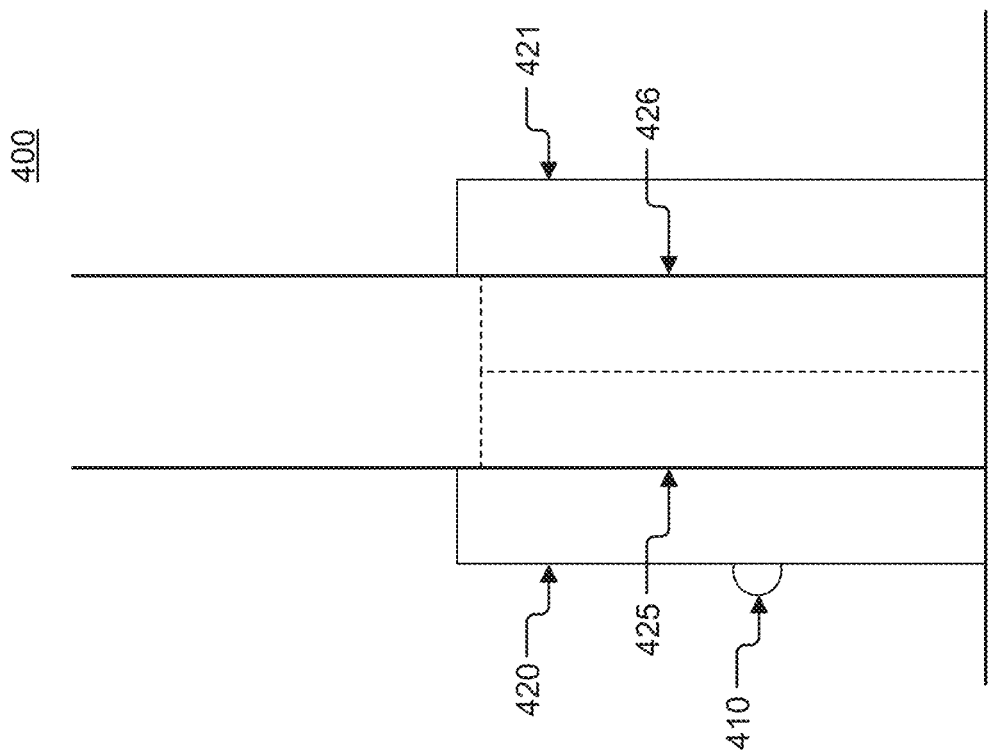
FIG. 4A illustrates a side view of an installed exemplary pet door, according to some embodiments of the present disclosure.
Figure 5A:
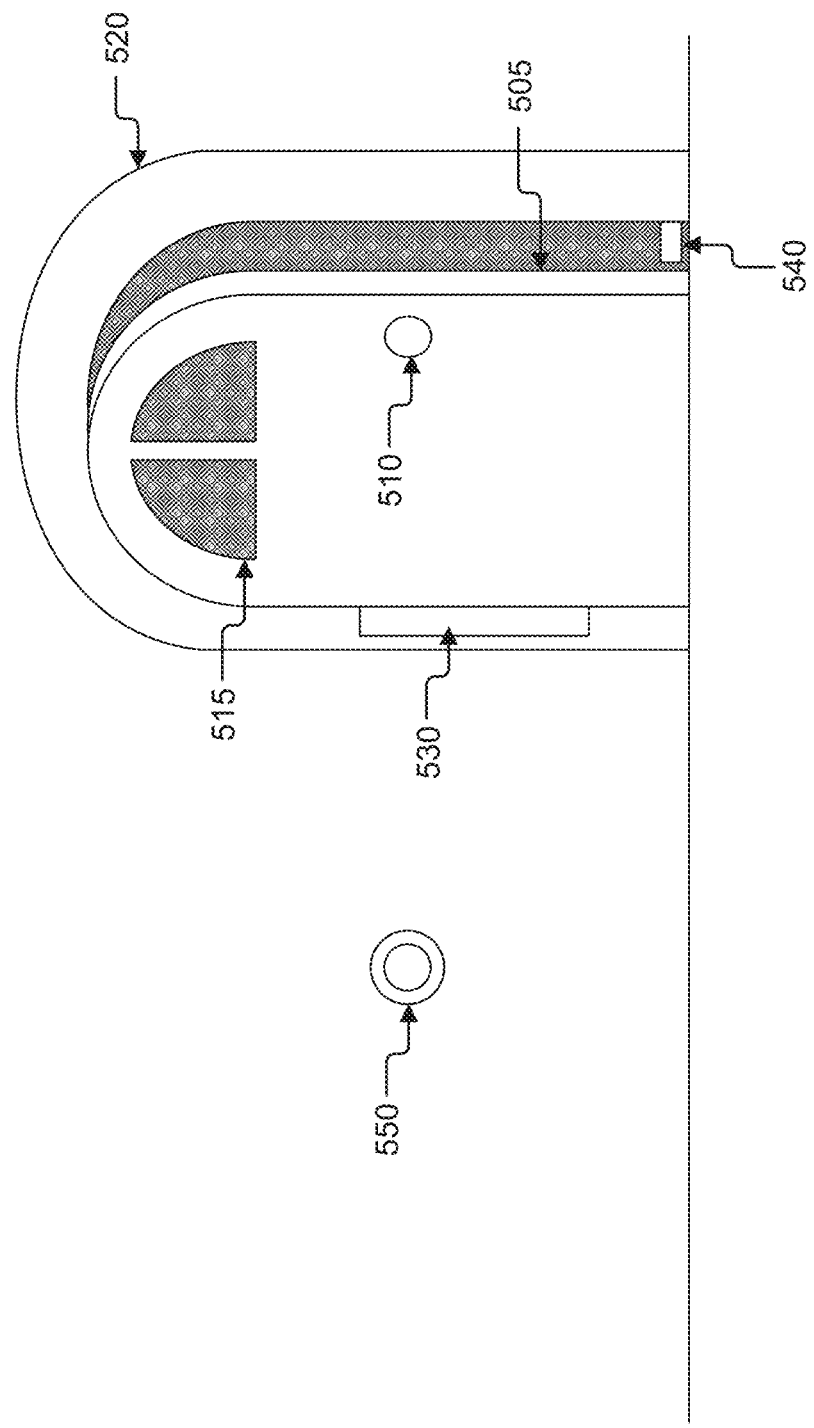
FIG. 5A illustrates an exemplary pet door with an external door stopper, according to some embodiments of the present disclosure.
Figure 5B:
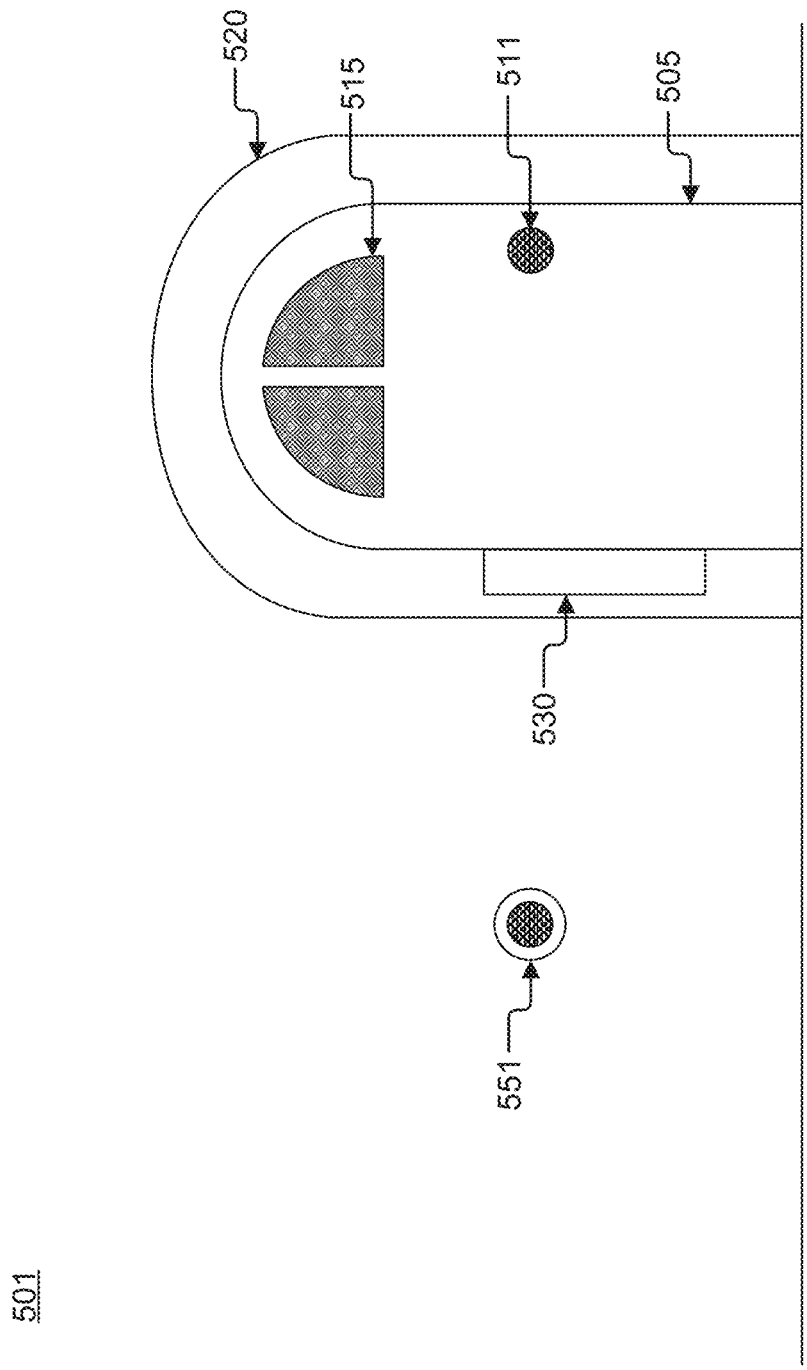
FIG. 5B illustrates an exemplary pet door with an external door stopper, according to some embodiments of the present disclosure.
Figure 5C:
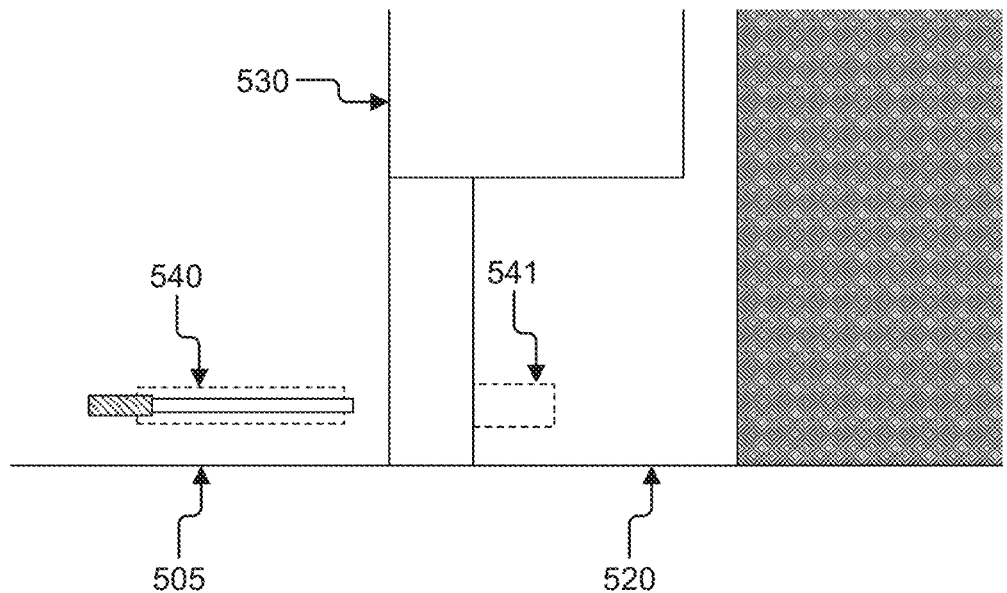
FIG. 5C illustrates an exemplary pet door with an external door stopper, according to some embodiments of the present disclosure.
Figure 5D:
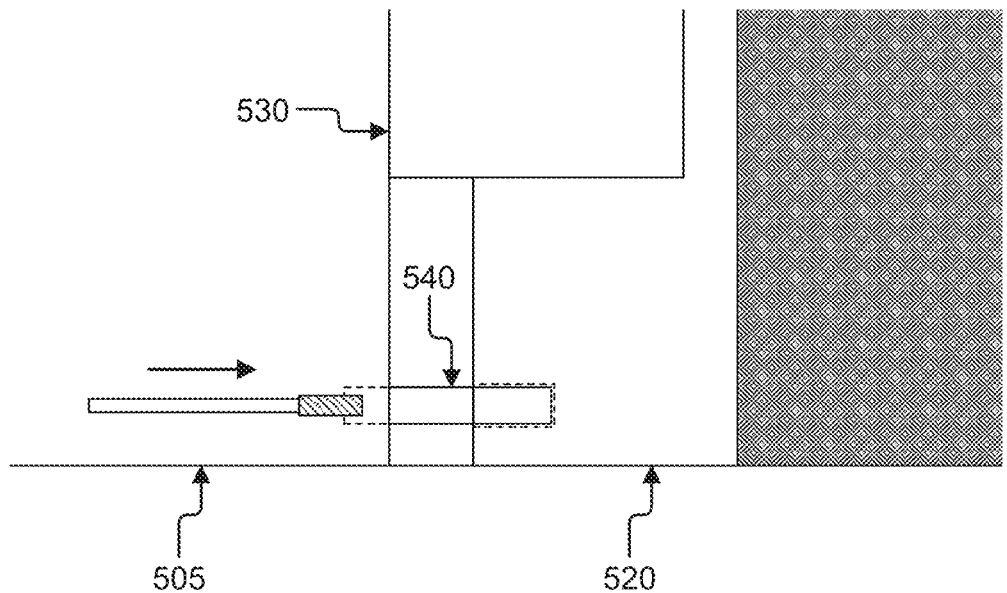
FIG. 5D illustrates an exemplary pet door with an external door stopper, according to some embodiments of the present disclosure.

Referring now to FIGS. 4A-B, a side view of an exemplary pet door 400, 401 is illustrated. In some embodiments, the pet door 400 may comprise a knob 410. In some implementations, the pet door 400 may comprise a first frame 420 and a second frame 421. When the pet door 400 comprises a first 420 and second 421 frame, the pet door 400 may also comprise a first connected frame 425 and a second connected frame 426. The first connected frame 425 may be coupled to the first frame 420 and the second connector frame 426 may be coupled between the first connected frame 425 and the second frame 421. This configuration may allow the pet door 400 to insert into an exterior or interior wall or door so that the first frame 420 and second frame 421 protrude from the opposing surfaces of the exterior or interior wall or door.

In some implementations, the pet door 401 may comprise a knob 411, a first recessed frame 422, a second recessed frame 423, a first connector frame 427 coupled to the first recessed frame 422, and a second recessed frame 428 coupled between the first connector frame 427 and the second recessed frame 423. This configuration may allow the pet door 401 to insert into an exterior or interior wall or door so that the entire pet door 401, when closed, is at most flush with the existing exterior or interior wall or door. In some embodiments, a pet door 400 may drop into a pocket where it can lock in place.

For example, an interior door in a home may slide into a pocket in the wall. If a pet owner wanted to install a pet door 400 to the interior door, the interior door may be unable to function normally. If a pet owner, however, installed a pet door 401 to the interior door, the door would still be able to slide into and out of the associated pocket in the wall.

Referring now to FIGS. 5A-E, an exemplary pet door 500, 501, 502 with a door stopper 540, 541, 550, 551 is shown. In some embodiments, the pet door 500 may comprise a door 505, a knob 510, a plurality of windows 515, a frame 520, and a hinge 530. In some implementations, the frame 520 may comprise an interior door stopper 540.

In some aspects, the interior door stopper 540, 541, 550, 551 may protrude from the frame 520 and catch the door 505, preventing it from fully closing. In some embodiments, the interior door stopper 540 may protrude from the door 505 and insert into a recess in the frame 520, securing the door 505 within the frame 520 when closed. In some aspects, the pet door 500, 501, 502 may interface with an external door stopper 541, 550, 551.

In some implementations, the external door stopper 541 may align to a corner of the door 505 so when the door 505 is in its maximally opened position, the corner of the door 505 may rest on, couples to, or attaches to the external door stopper 541. In some embodiments, the connection between the external door stopper 541 may be maintained by a lock-and-key mechanism, magnets, hook-and-loop fastener, adhesive material, or other non-limiting examples.

In some implementations, the external door stopper 550, 551 may receive the knob 510 of the door 505 when the door 505 is in its maximally opened position. In some embodiments, the external door stopper 550, 551 may be sized to accommodate the knob 510. In some aspects, the connection between the external door stopper 550, 551 and the knob 510 may be maintained by a lock-and-key mechanism, magnets, hook-and-loop fastener, adhesive material, or other non-limiting examples. In some embodiments, the external door stopper 550, 551 may couple to the same exterior or interior wall or door as the pet door 500, 501 is installed into at a predetermined distance from the pet door 500, 501 so the external door stopper 550, 551 may properly receive the knob 510. This may allow the pet owner to secure the door 505 in an open position, so the pet may pass freely through the pet door 500.

Figure 6:
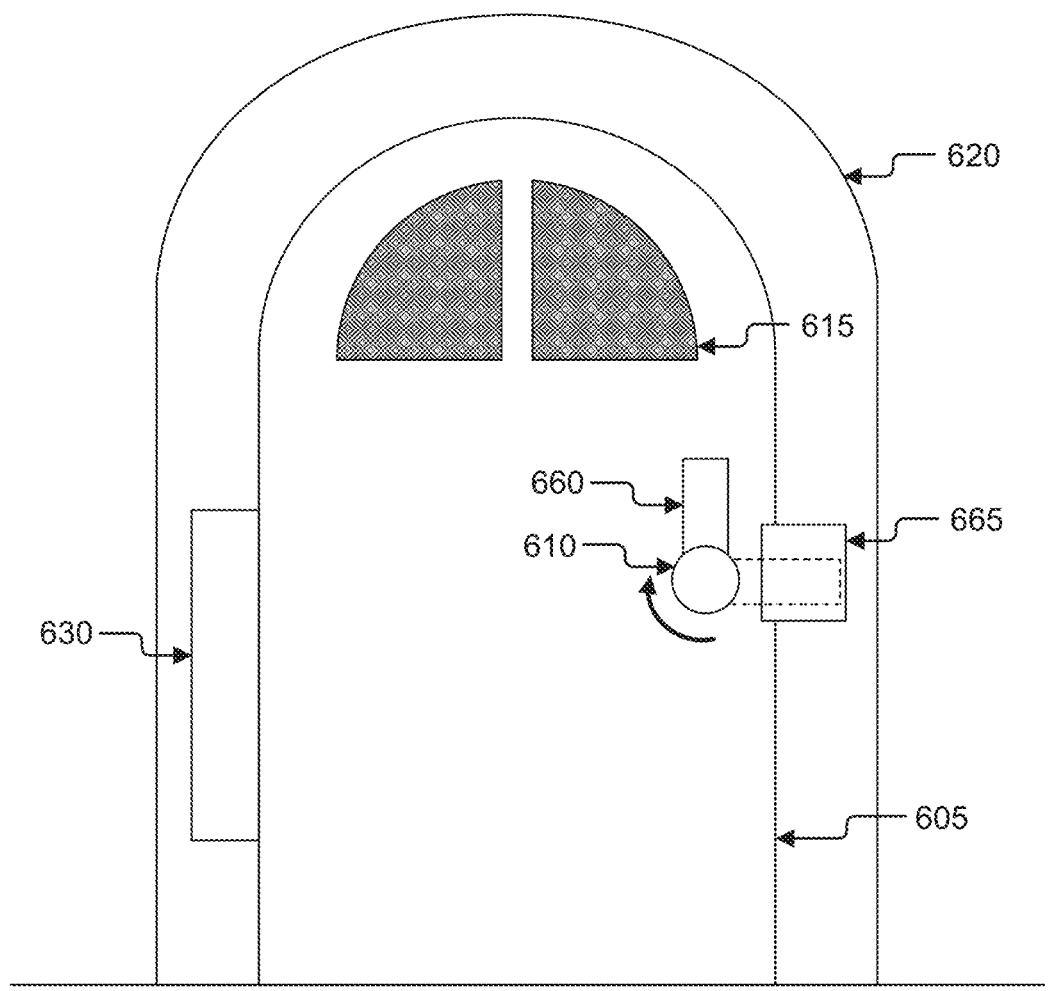
FIG. 6 illustrates an exemplary pet door comprising a latch, according to some embodiments of the present disclosure.

Referring now to FIG. 6, an exemplary pet door 600 is illustrated. In some aspects, the pet door 600 may comprise a door 605. In some embodiments, the pet door 600 may comprise a knob 610. In some aspects, the pet door 600 may also comprise a one or more windows 615. In some implementations, the pet door 600 may comprise a frame 620. In some aspects, the pet door 600 may comprise a hinge 630. In some embodiments, the knob 610 may comprise a locking mechanism. For example, the locking mechanism may comprise a latch 660 and the frame 620 may comprise a latch receiver 665.

For example, the knob 610 may comprise a latch 660 that rotates and inserts into a latch receiver 665 to secure the door 605 in a completely closed position. The latch receiver 665 may be removable so that a pet owner could freely decide the orientation of the door 605 within the frame 620. In some implementations, the latch receiver 665 may couple to the frame 620, magnetically or by some other non-limiting adhesive, or be permanently carved into the frame 620. The latch 660 may be coupled to the knob 610, but this is not limiting.

In some aspects, the latch 660 may be coupled to any part of the pet door 600 and the latch receiver may also be coupled to any part of the pet door 600 or located at some point near it for use. The latch 660 and corresponding latch receiver may allow the pet owner to secure the door 605 in a closed position when the pet door 600 is not in use by a pet, such as when the pet door 600 is an exterior pet door and the pet owner does not want dirt and other outside elements to be tracked or blown into their home.

Figure 7B:
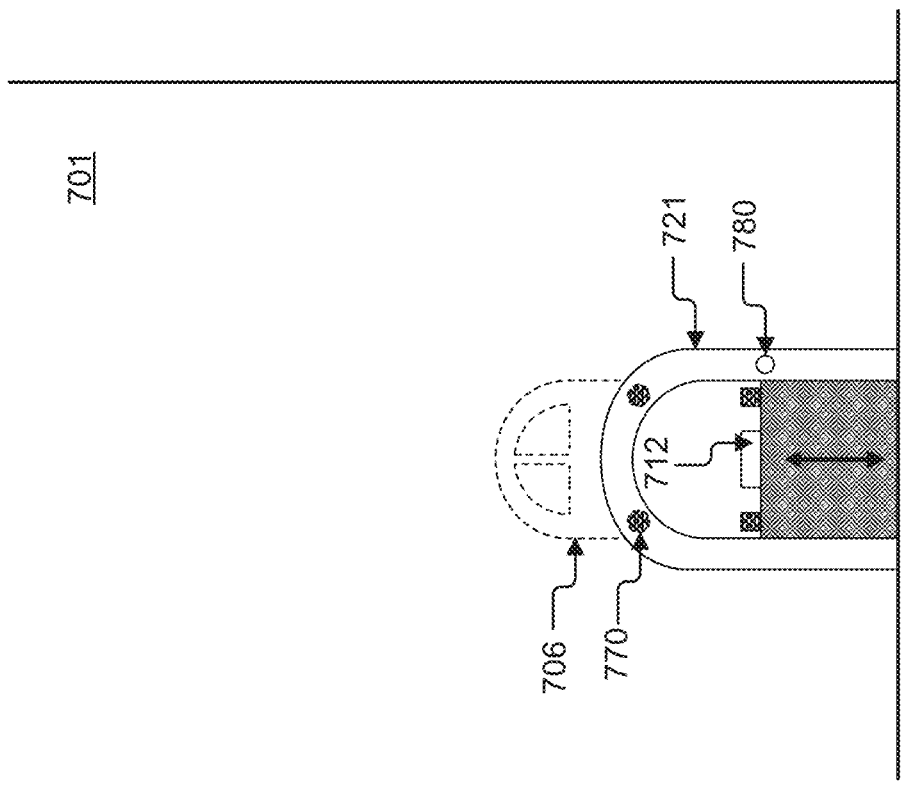
FIG. 7B illustrates an exemplary sliding pet door, according to some embodiments of the present disclosure.
Figure 7A:
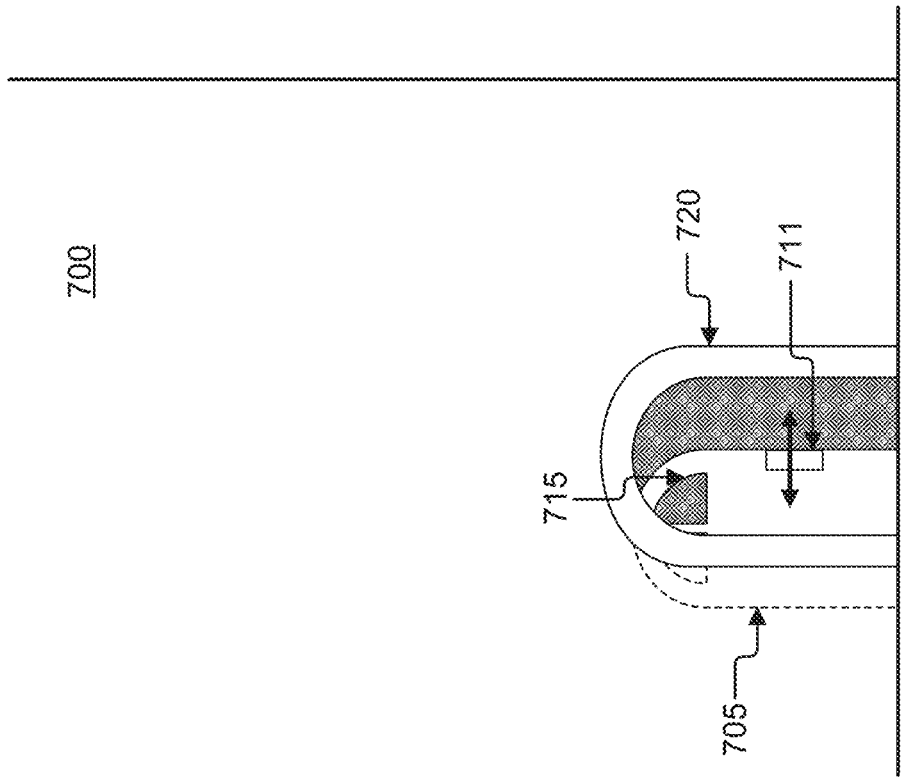
FIG. 7A illustrates an exemplary sliding pet door, according to some embodiments of the present disclosure.

Referring now to FIGS. 7A-B, an exemplary sliding pet door 700, 701 is illustrated. In some embodiments, the sliding pet door 700, 701 may comprise a door 705, 706, a knob 711, 712, and a frame 720, 721. In some implementations, the sliding pet door 700 may comprise a plurality of windows 715. In some aspects, the sliding pet door 701 may comprise attachment mechanism 770 or an activation mechanism 780, or both. The attachment mechanism 770 may comprise a plurality of magnets, a plurality of hook-and-loop closures, or other non-limiting equivalents. In some implementations, the activation mechanism 780 may comprise a doorbell.

In some embodiments, the door 705, 706 may slide into and out from the door frame 720, 721. The door 705, 706 may slide either horizontally or vertically. In some implementations, the door 705, 706 may be adjustable within the door frame 720, 721 to be able to slide both horizontally or vertically, depending on which mode is in use. In some aspects, the door fixture 711, 712 may secure the door 705, 706 in an open or closed position by coupling to opposite ends of the door frame 720, 721. This may allow the door 705, 706 to be secured in a preferred position based on the needs of the pet owner and the pet using the door 705, 706.

In some embodiments, the door 706 and the door frame 721 may comprise magnets 770 that couple together when the door 706 is in a partial or maximally open position. These magnets 770 may secure the door 706 in place, so the door 706 does not close on a pet travelling through. In other implementations, the door frame 721 may comprise an activation mechanism 780. In some aspects, the activation mechanism 780 may comprise a doorbell. The pet may be trained to use the activation mechanism 780, allowing the door 706 to be operated semi-automatically in response to the pet's stimulus.

Referring now to FIGS. 8A-B, an exemplary pet door 800 is illustrated. In some embodiments, the pet door 800 may comprise a door 805. In some aspects, the pet door 800 may comprise a knob 810. In some implementations, the pet door 800 may comprise one or more windows 815. In some embodiments, the pet door 800 may comprise a frame 820. In some aspects, the pet door may comprise a hinge 830. In some implementations, the hinge 830 may be arranged on the door 805 and the frame 820 so that the door 805 flips open either vertically or horizontally. In some embodiments, the pet door 800 may interface with an interior or exterior household door, such as a cabinet door as a non-limiting example.

Current solutions for pet doors are limited to certain types of doors or walls. The ability of the pet door 800 to interface with any household barrier or surface, including a kitchen cabinet 890, as a non-limiting example, allows the pet door 800 to be used universally throughout a pet owner's home. The customizable orientation of the frame 820 and hinge 830 also provide more options to pet owners to serve a variety of spaces and decor.

In some aspects, the knob 810 may twist in order for the pet door 800 to be opened. In a closed position, the knob 810 may interact with an interior or exterior locking mechanism to secure the door 805 in the closed position. In some embodiments, twisting the knob 810 for a certain number of degrees may secure the door 805 in a plurality of positions between a fully closed and a fully opened position, including the fully opened position. For example, the knob 810 may pair with an interior knob 811. When twisted, the interior knob 811 may lock the door 805 in a fully opened position. This would allow for safe passage of the pet through the door 805 without clipping a tail or catching any fur, which may cause undue pain to the pet if these things occurred.

Figure 9:
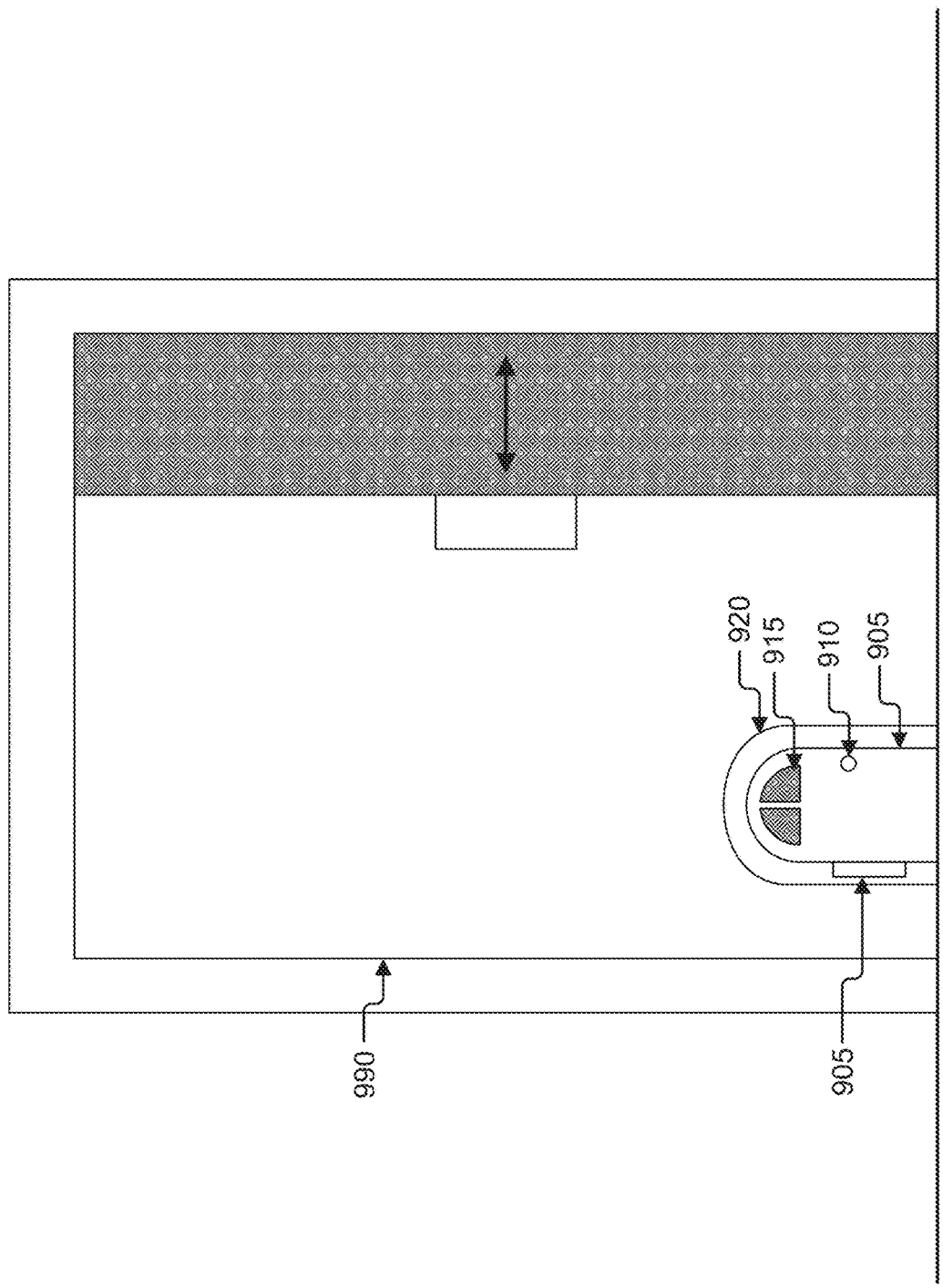
FIG. 9 illustrates an exemplary pet door, according to some embodiments of the present disclosure.
Figure 11C:
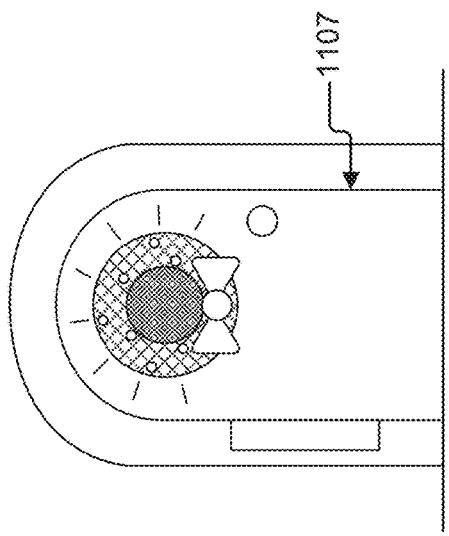
FIG. 11C illustrates an exemplary pet door, according to some embodiments of the present disclosure.
Figure 11D:
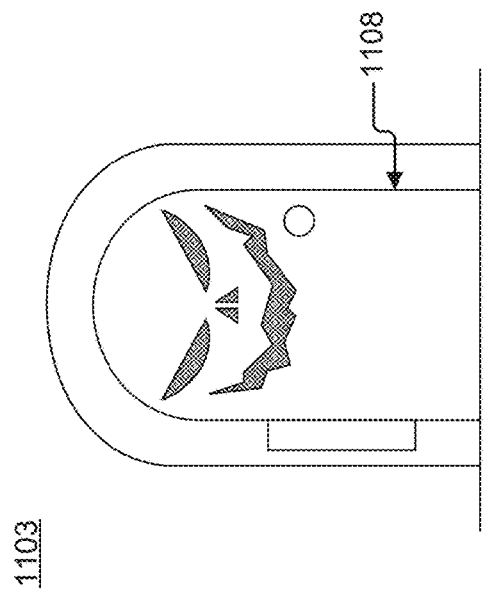
FIG. 11D illustrates an exemplary pet door, according to some embodiments of the present disclosure.
Figure 11A:
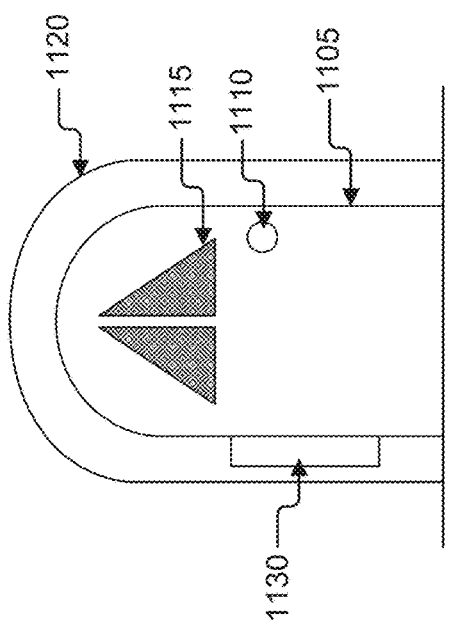
FIG. 11A illustrates an exemplary pet door, according to some embodiments of the present disclosure.
Figure 11B:
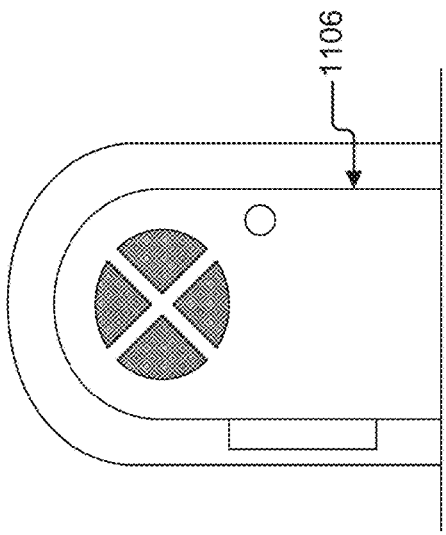
FIG. 11B illustrates an exemplary pet door, according to some embodiments of the present disclosure.
Figure 11E:
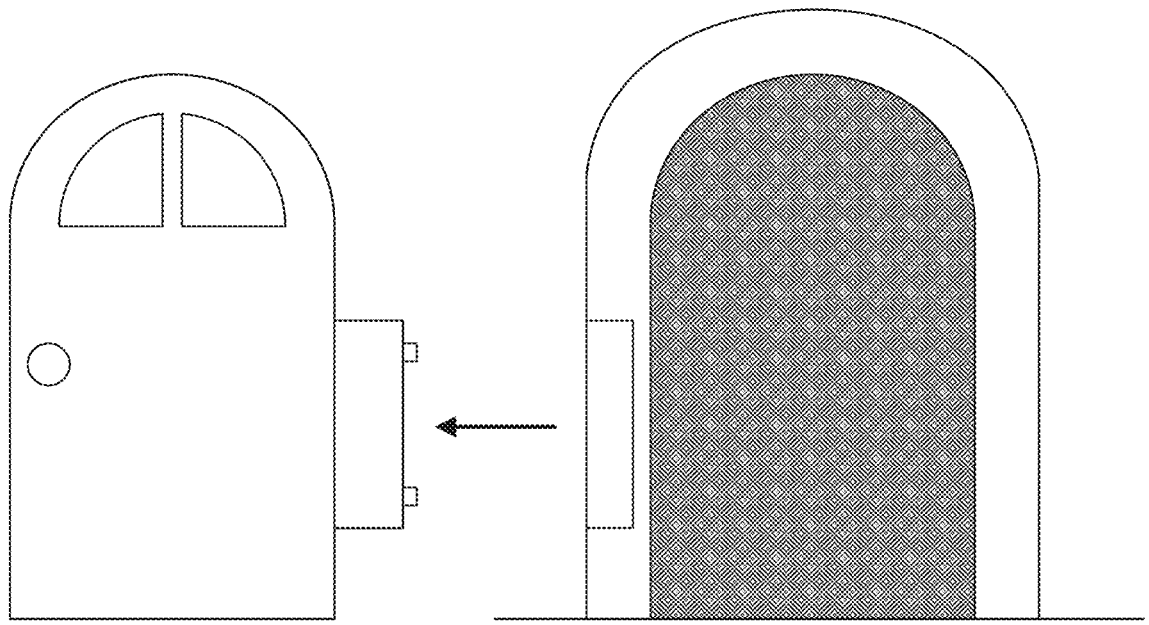
FIG. 11E illustrates an interchangeable exemplary pet door, according to some embodiments of the present disclosure.
Figure 11F:
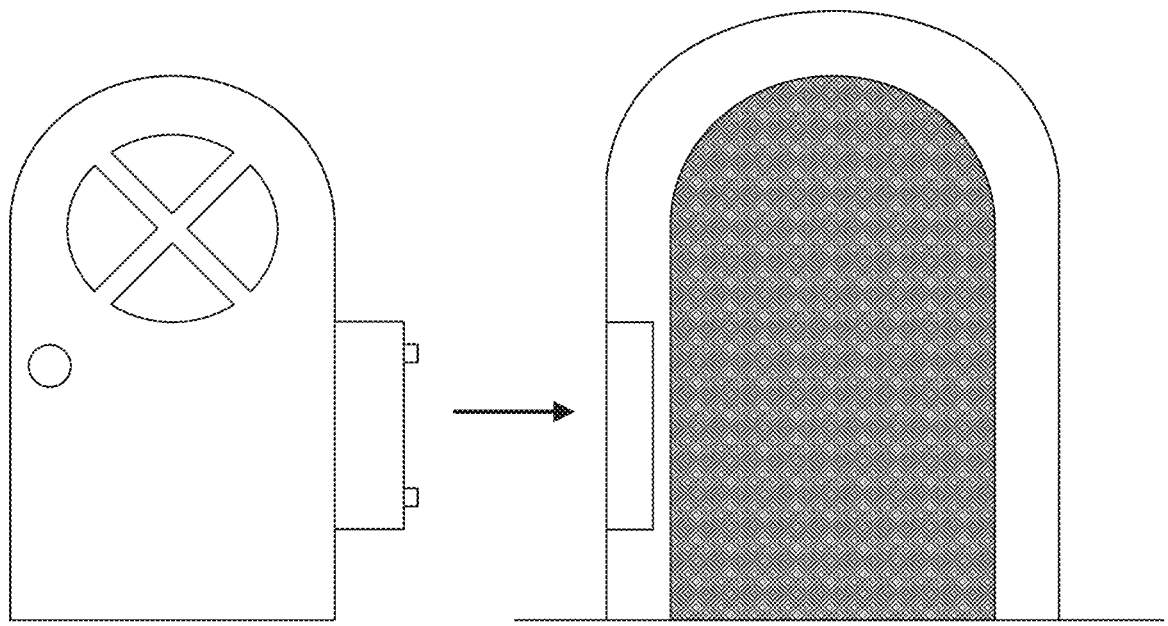
FIG. 11F illustrates an interchangeable exemplary pet door, according to some embodiments of the present disclosure.

Referring now to FIG. 9, an exemplary pet door 900 is illustrated. In some implementations, the pet door 900 may be installed on an interior or exterior household door, such as a sliding or pocket door 990, as a non-limiting example. In some aspects, the pet door 900 may comprise a door 905 and a knob 910. In some embodiments, the pet door 900 may comprise one or more windows 915, a frame 920, and a hinge 905. In some implementations, the pet door 900 may be completely flush to the paired household door, in order to allow the existing household door to function properly. For example, the ability for the pet door 900 to be installed in a way in which the door 905 and frame 920 are completely flush with the sliding or pocket door 990 allows pet owners to install the pet door 900 in places otherwise previously unable to utilize a pet door.

Referring now to FIG. 10, an exemplary revolving pet door 1000 is illustrated. In some aspects, the revolving pet door 1000 may comprise a door 1005, a plurality of windows 1015, a frame 1020, and an axis 1030. When force is applied, the door 1005 may revolve about the axis 1030 within the frame 1020. In some embodiments, the door 1005 and the frame 1020 may comprise paired magnets 1070 so the door 1005 may be secured in a completely closed position when not in use. The secured door 1005 allows the pet owner to control traffic flow of their pet or pets through the pet door 1000. For example, if the pet owner has guests over, they might not want their pet to travel through an interior or exterior pet door 1000 for security and sanitation purposes. The ability to secure the pet door in a closed position allows pet owners the ability to enable their pets to use the pet door 1000 as they prefer and need.

In some implementations, the door 1005 may revolve about the axis 1030 in one or more directions. In some aspects, the revolving pet door 1000 may be installed in a panel accompanying an interior or exterior household door or on the interior or exterior household door, itself. As a non-limiting example, the revolving pet door 1000 may be installed in a panel 1090 beside an exterior sliding glass door. The panel 1090 may allow for a secure seal with a sliding glass door without requiring cutting into the glass of the window. This installation method enables a pet owner to utilize the pet door 1000 in multiple scenarios, such as when they would like to install the pet door 1000 near a glass door in their home.

For example, it may be overly expensive and unreasonable to carve a hole in an existing glass door, or order a custom glass door to accommodate a pet entryway. The pet door 1000 enables simplified installation of a pet entryway near a specialty home door, such as a sliding glass, without disrupting the present configuration in a pet owner's home.

Referring now to FIGS. 11A-F, exemplary pet door 1100, 1101, 1102, 1103 are shown. In some embodiments, the pet door 1100, 1101, 1102, 1103 may comprise a door 1105, 1106, 1107, 1108. In some implementations, the pet door 1100, 1101, 1102, 1103 may comprise a knob 1110. In some aspects, the pet door 1100, 1101, 1102, 1103 may comprise one or more windows 1115. In some embodiments, the pet door 1100, 1101, 1102, 1103 may comprise a frame 1120.

In some implementations, the pet door 1100, 1101, 1102, and 1103 may comprise a hinge 1130. The pet door 1100, 1109 may detach from the hinge 1130 and be interchangeable within the frame with pet doors 1101, 1102, 1103, 1104. This may allow for pet owners to customize the appearance of the pet door 1100, 1101, 1102, 1103, such as in response to changing holiday seasons, as a non-limiting example.

For example, pet door 1100, 1101 may comprise an appearance similar to that of a standard household door and an interchangeable pet door 1102, 1103 may comprise an appearance relating to a particular season or holiday. The pet owner may choose to replace pet door 1100, 1101 with either 1102, 1103 or some other non-limiting embodiment so that the pet door 1102, 1103 coincides with the present season or holiday.

Figure 12A:
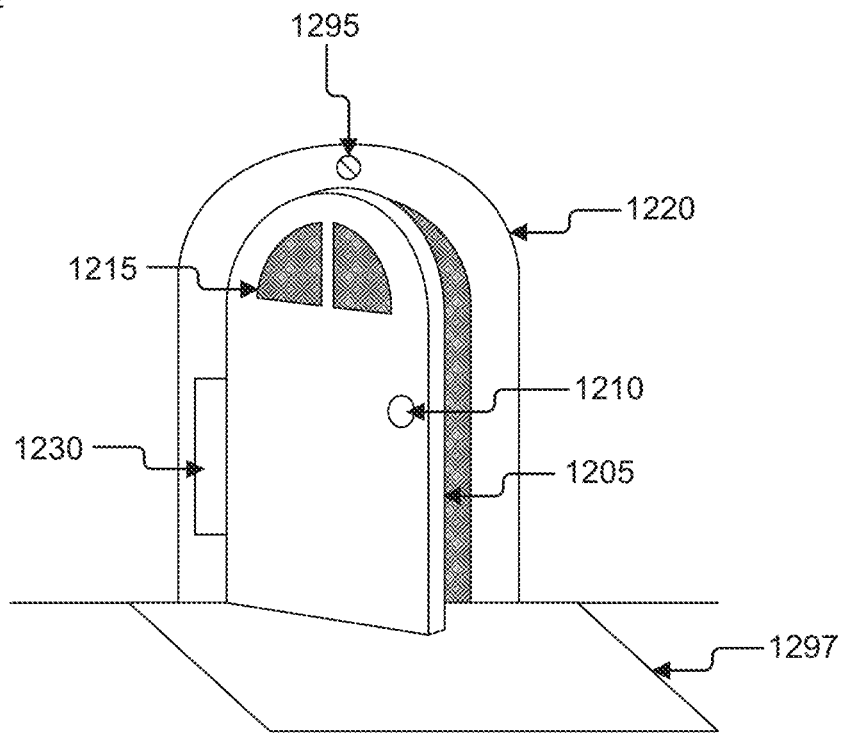
FIG. 12A illustrates an exemplary pet door, according to some embodiments of the present disclosure.
Figure 12B:
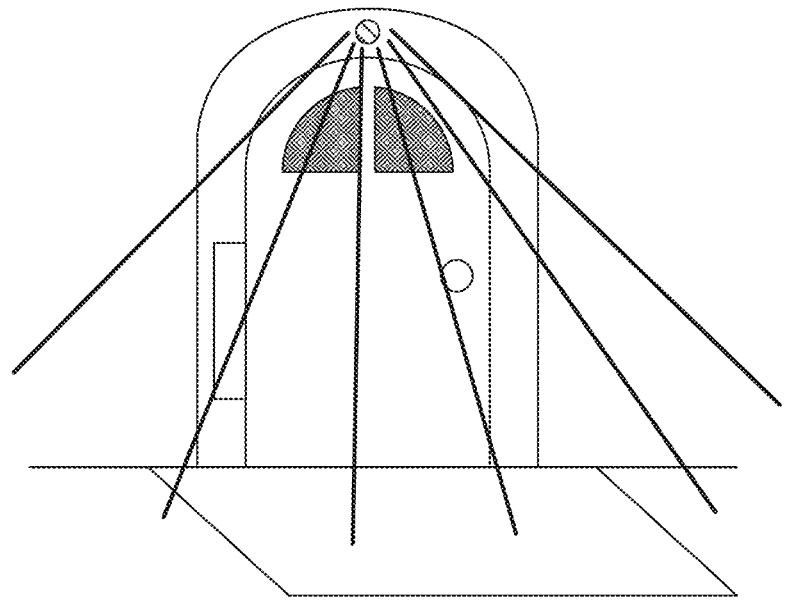
FIG. 12B illustrates an exemplary pet door, according to some embodiments of the present disclosure.

Referring now to FIGS. 12A-B, an exemplary pet door 1200 is shown. The pet door 1200 may comprise a door 1205, a knob 1210, a plurality of windows 1215, a frame 1220, and a hinge 1230. In some implementations, the pet door 1200 may comprise a sensor 1295. This sensor may use a sensing technology, such as motion, infrared, temperature, or other non-limiting equivalent, to detect the presence of a pet. In some embodiments, the sensor 1295 may open the door 1205 so the pet may pass through.

In some aspects, the sensor 1295 may also be also to sense once a pet has passed through the door, and after a predetermined or manually-programmed time period, the sensor 1295 may close the door 1205. This would allow the pet door 1200 to operate the door 1205 semi-automatically in response to a predetermined stimulus.

In some implementations, the pet door 1200 may pair with an external device 1297, such as a doormat, that communicates with the sensor 1295, via a logical communication such as Bluetooth, so that when a pet applies pressure to the external device 1297, the sensor 1295 receives a signal to open the door 1205. Once the pet has relieved pressure from the external device 1297, after a predetermined or pet owner-programmed time period, the external device 1297 may communicate with the sensor 1295, which in turn may close the door 1205. Having the ability to program the time period during which the pet door 1200 may be opened, or the time it would take to open or close after being prompted by the pet owner, enables the pet door 1200 to operate semi-automatically.

In some implementations, the external device 1297 may be programmable to accept a certain threshold of pressure to communicate with the sensor 1295. For example, if the pet weighs 10 pounds, the pet owner may program the external device 1297 to trigger the sensor 1295 when at least 2 pounds of pressure is applied to the external device 1297.

In some aspects, the sensor 1295 may operate in tandem and separately from the external device 1297. As non-limiting examples, the sensor 1295 may detect motion or utilize infrared technology in addition to receiving logical communication from the external device 1297 in order to open the door 1205. This would enable the pet door 1200 to open or close based on sensing the presence of a pet, or in response to a combination of stimulus provided by a trained pet, in order for the pet door 1200 to operate semi-automatically.

In some embodiments, the sensor 1295 may also act as an attraction mechanism, drawing pets to the location of the door so that the pets may, over time, learn where the door is located and how to travel through it. This attraction mechanism may comprise a blinking light, a specialized sound emitter, or some other non-limiting equivalent that would attract, and not deter, a pet. For example, a trained pet could learn to trigger the pet door 1200 to open and close, and in response the pet door 1200 may react semi-automatically depending on the stimulus.

In some implementations, the sensor 1295 may comprise a camera and a radio frequency, Bluetooth, or another non-limiting signal that allows the pet door 1200 to communicate with a mobile device, such as a cell phone. The pet owner may download an application onto the cell phone for use with the pet door 1200. In some aspects, the sensor 1295 may sense the arrival or departure of a pet, inform the pet owner via the cell phone application, and allow the pet owner to remotely open or close the door 1205, accordingly. This may enable semi-automatic operation of the pet door 1200 via a smartphone application, motion or presence of a pet, a stimulus executed by a trained pet, and other combination of non-limiting equivalent examples.

Figure 13A:
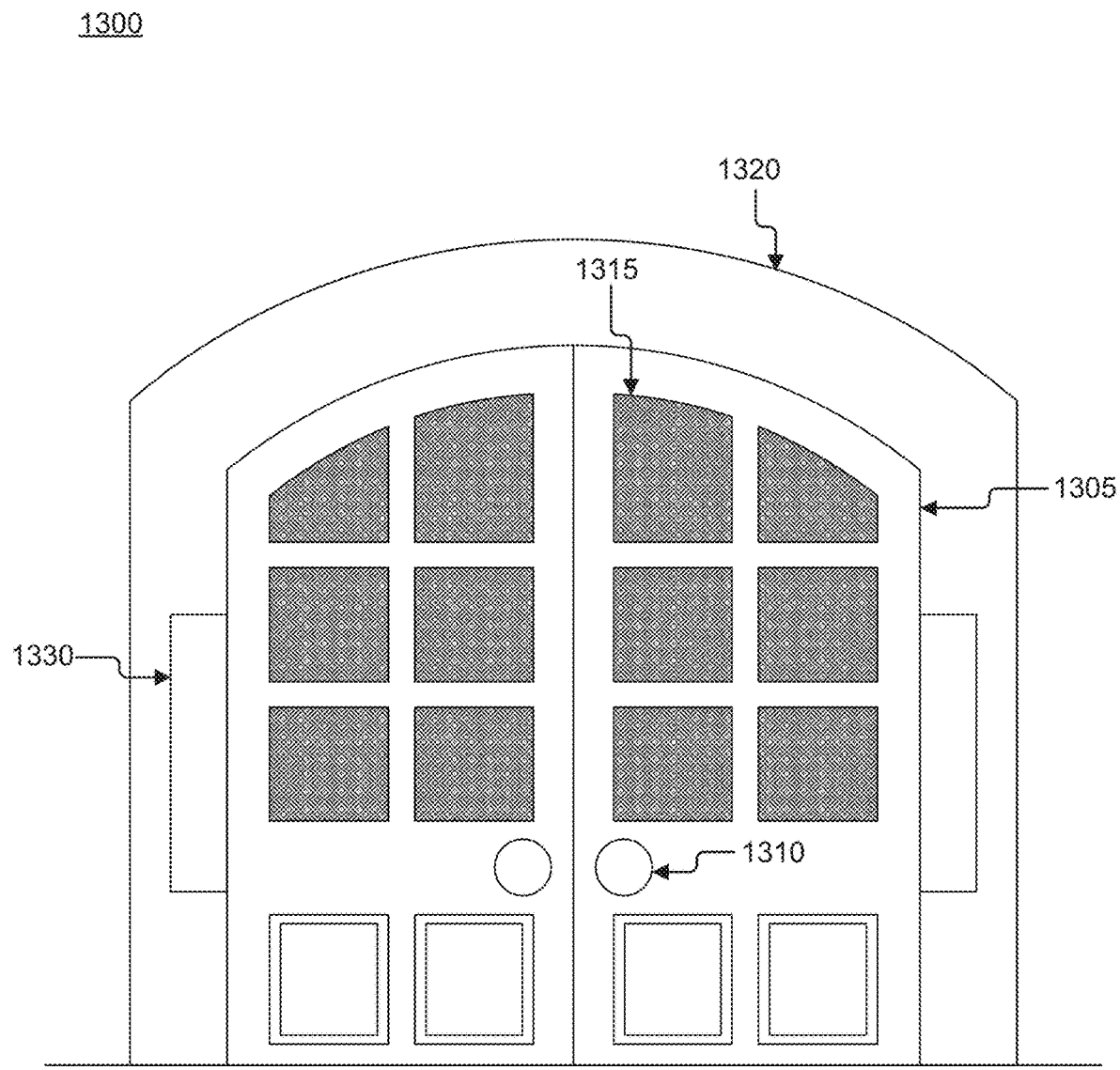
FIG. 13A illustrates a front view of an exemplary pet door, according to some embodiments of the present disclosure.
Figure 13B:
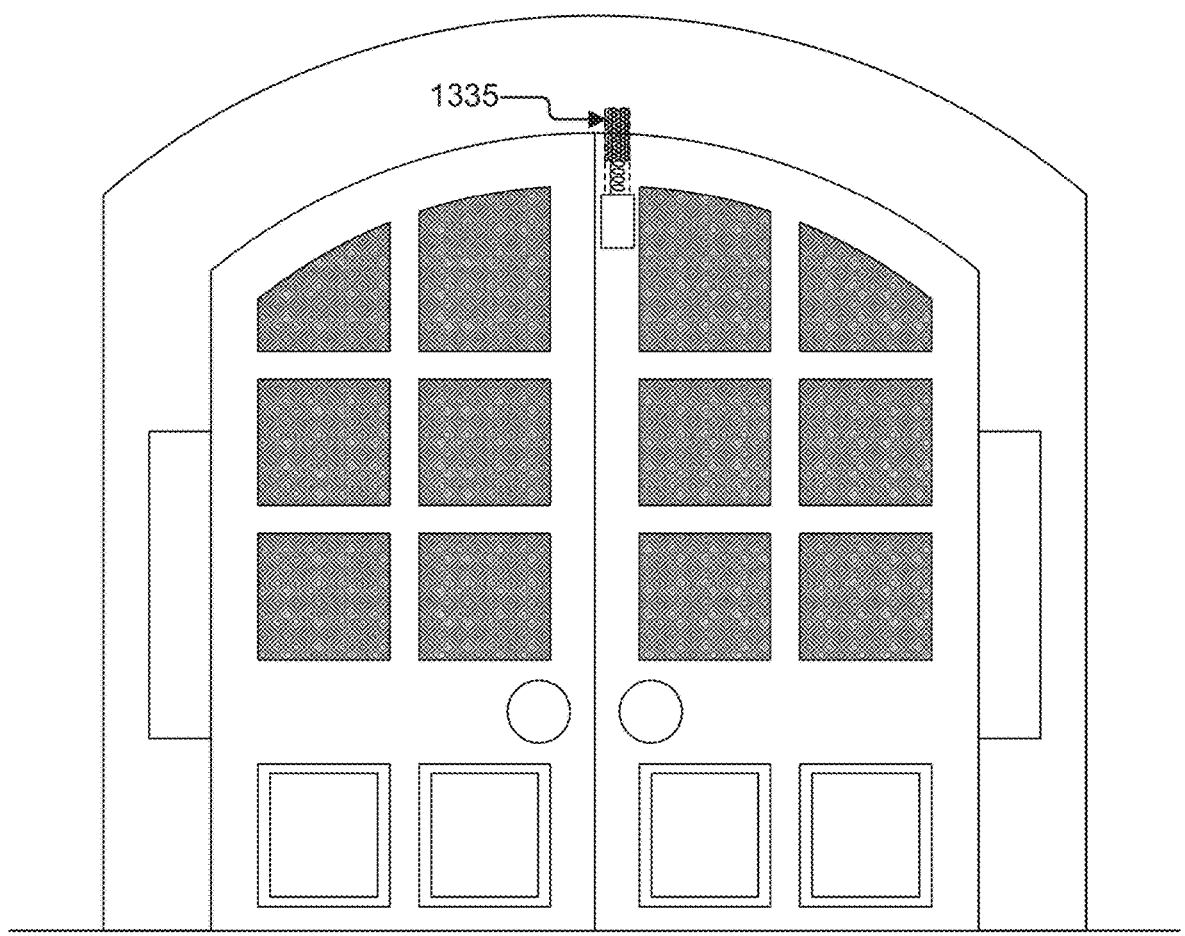
FIG. 13B illustrates a front view of an exemplary pet door comprising a locking mechanism, according to some embodiments of the present disclosure.

Referring now to FIGS. 13A-B, a front view of an exemplary pet door 1300 is illustrated. In some embodiments, a pet door 1300 may comprise double doors 1305 that may open by a hinge 1330. In some aspects, a pet door 1300 may comprise windows 1315 and door knobs 1310. In some implementations, the windows 1315 may be decorative, such as where they may not be transparent.

In some embodiments, the pet door 1300 may comprise a locking mechanism 1335. In some aspects, the locking mechanism 1335 may be spring-loaded. In some embodiments, the locking mechanism 1335 may secure the pet door 1300 in a closed state.

In some implementations, the locking mechanism 1335 may alter the size of the accessible entryway. For example, the locking mechanism 1335 may secure a singular door from a pair of French doors that restricts the size of the entryway from the size of two open doors to the size of one open door.

In some aspects, the locking mechanism 1335 may work in conjunction with another component of the pet door 1300. As an illustrative example, the locking mechanism may operate in conjunction with the knob to form a secure closed state for the pet door 1300. The locking mechanism 1335 may provide a securing point between the door 1305 and the frame 1320 that provides sufficient rigidity to keep a double set of doors closed, whereas only securing the pet door 1300 by a knob-operated latching mechanism may still allow some leeway in the security of the pet door 1300 that allows the latching mechanism to slip or break when enough force is applied to the middle of the double doors.

In some embodiments, double doors 1305 may be nested into an outer frame 1320, wherein the outer frame 1320 may be at least partially embedded into a surface, such as a door or wall. In some implementations, double doors 1305 may have a locking mechanism wherein the door may lock once both are closed together, such as illustrated in FIGS. 14A-14D. In some aspects, the frame 1320 may comprise a locking mechanism that allows the door 1305 to be interchangeable.

Figure 14A:
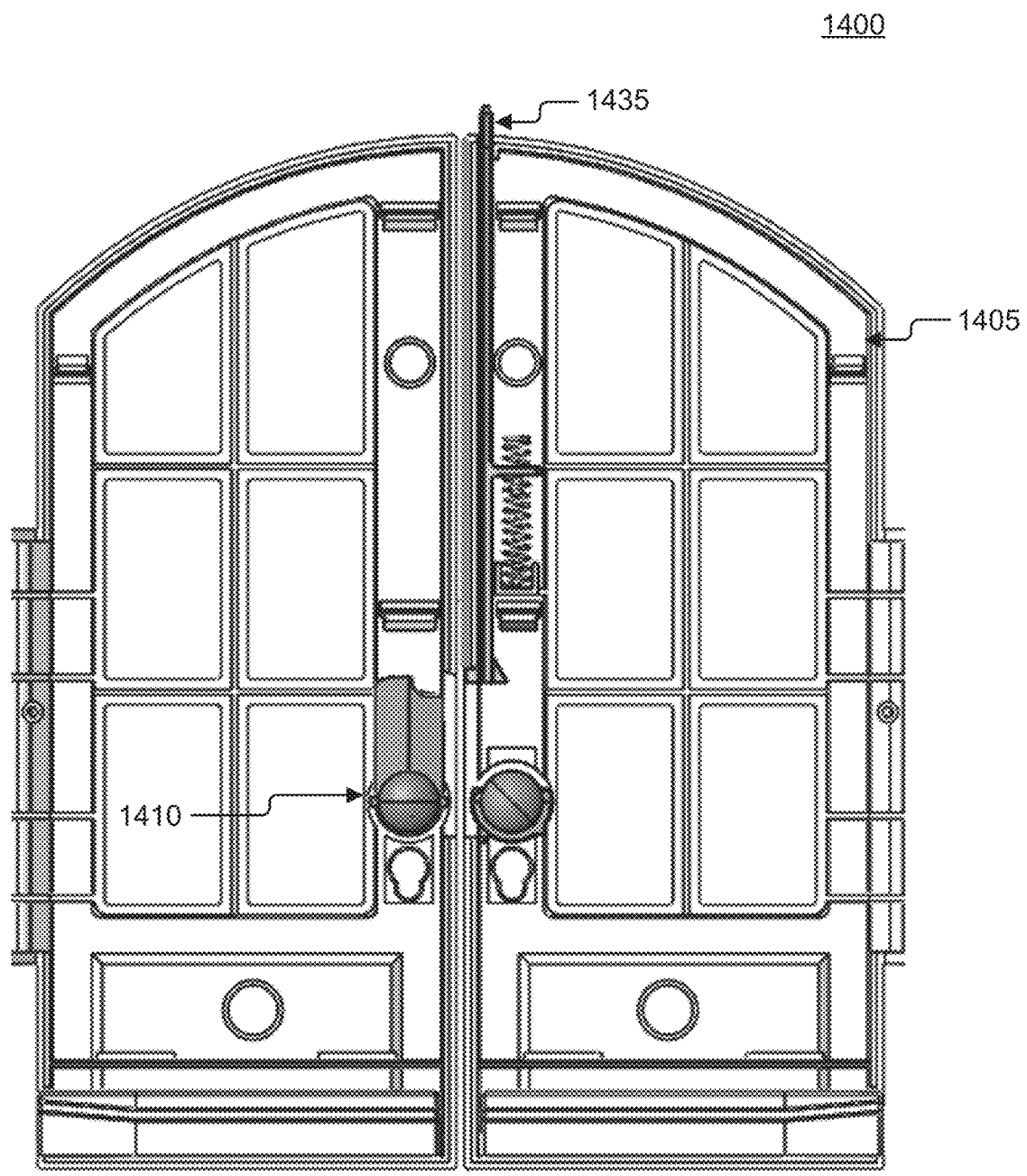
FIG. 14A illustrates a front view of an exemplary pet door comprising a locking mechanism, according to some embodiments of the present disclosure.
Figure 14B:
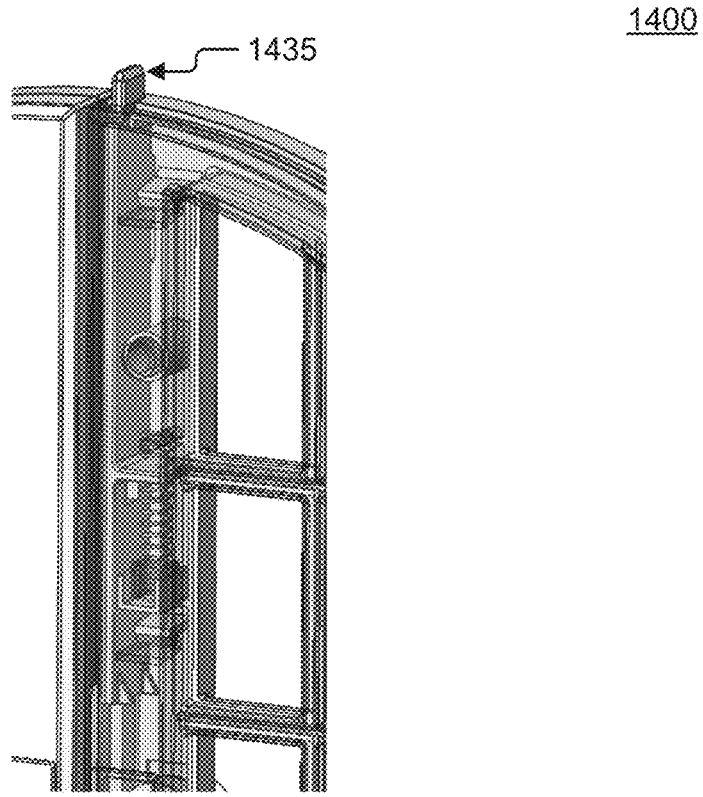
FIG. 14B illustrates a section view of an exemplary pet door comprising a locking mechanism, according to some embodiments of the present disclosure.
Figure 14C:
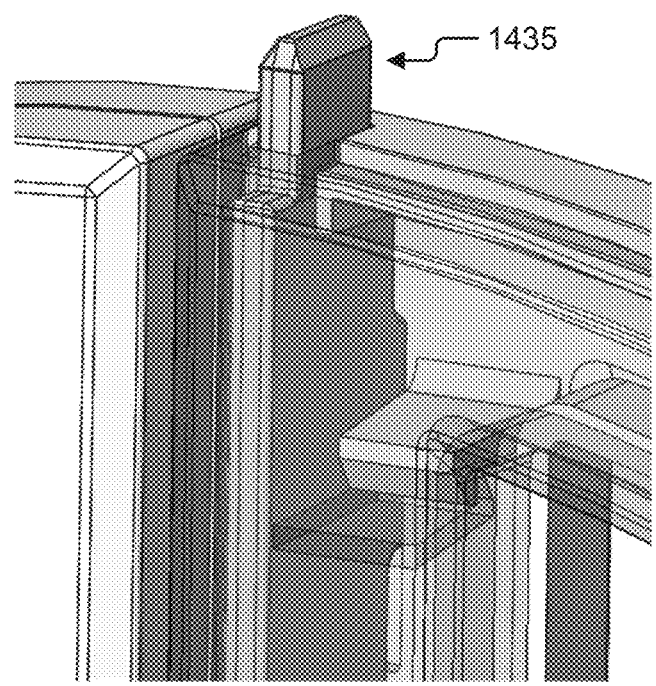
FIG. 14C illustrates a section view of an exemplary pet door comprising a locking mechanism, according to some embodiments of the present disclosure.

Referring now to FIGS. 14A-C, an exemplary pet door 1400 comprising a locking mechanism 1435 is illustrated. In some embodiments, the pet door 1400 may comprise a locking mechanism 1435. In some aspects, the locking mechanism 1435 may be spring-loaded. In some embodiments, the locking mechanism 1435 may secure the pet door 1400 in a closed state.

In some implementations, the locking mechanism 1435 may alter the size of the accessible entryway. For example, the locking mechanism 1435 may secure a singular door from a pair of French doors that restricts the size of the entryway from the size of two open doors to the size of one open door.

In some aspects, the locking mechanism 1435 may work in conjunction with another component of the pet door 1400. As an example, the locking mechanism may operate in conjunction with the knob 1410 to form a secure closed state for the pet door 1400. When there is a set of knobs 1410, one knob may rotate to secure the doors 1405 with a latch that secures the rotating knob 1410 against a second, fixed knob 1410.

The locking mechanism 1435 may provide a securing point between the door 1405 and the frame that provides sufficient rigidity to keep a double set of doors closed, whereas only securing the pet door 1400 by a knob-operated latching mechanism may still allow some leeway in the security of the pet door 1400 that allows the latching mechanism to slip or break when enough force is applied to the middle of a double set of doors 1405.

In some embodiments, double doors 1405 may be nested into an outer frame, wherein the outer frame may be at least partially embedded into a surface, such as a door or wall. In some implementations, double doors 1405 may have a locking mechanism 1435 wherein the door 1405 may lock once both are closed together.

Figure 15A:
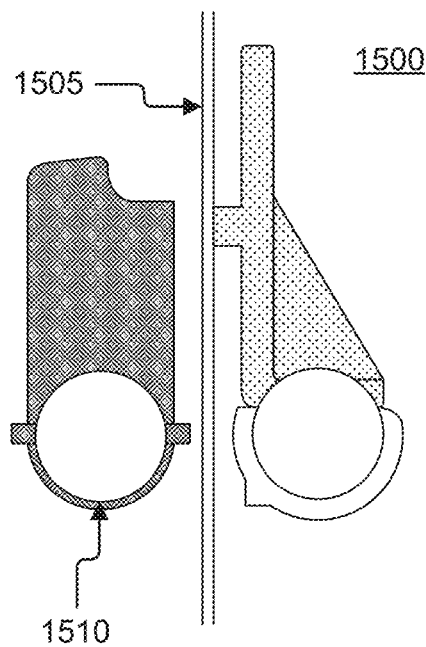
FIG. 15A illustrates an exemplary locking mechanism in an unlocked position, according to some embodiments of the present disclosure.
Figure 15B:
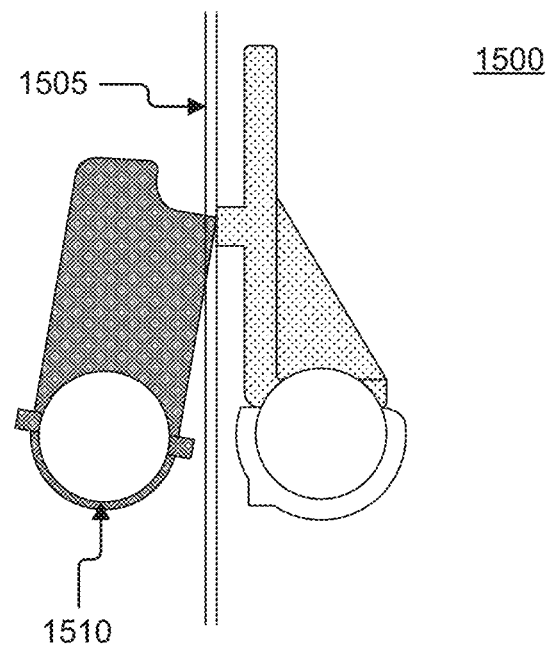
FIG. 15B illustrates an exemplary locking mechanism in an unlocked position, according to some embodiments of the present disclosure.
Figure 15C:
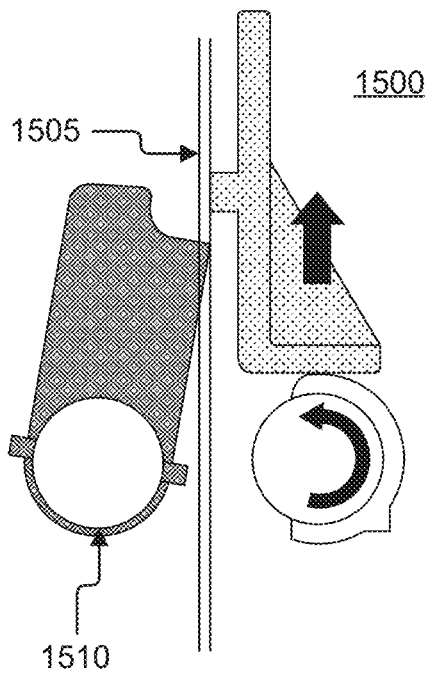
FIG. 15C illustrates an exemplary locking mechanism in a locking position, according to some embodiments of the present disclosure.
Figure 15D:
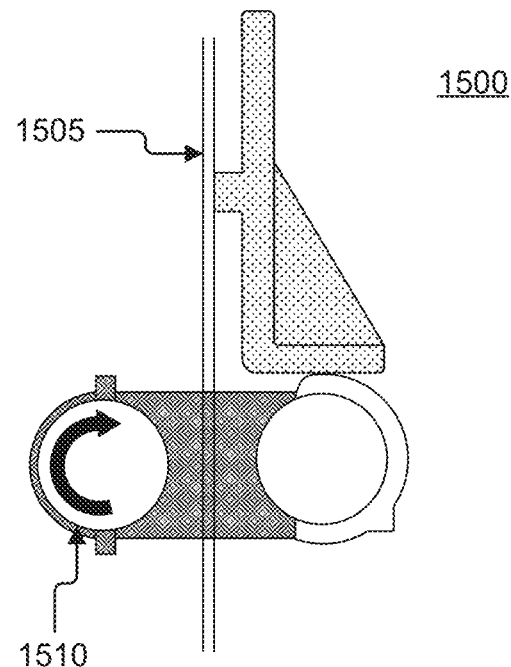
FIG. 15D illustrates an exemplary locking mechanism in a locked position, according to some embodiments of the present disclosure.

Referring now to FIGS. 15A-C, an exemplary locking mechanism 1500 in an unlocked position. Referring now to FIG. 15D, an exemplary locking mechanism 1500 in a locked position is illustrated. In some embodiments, a locking mechanism 1500 may comprise a latching mechanism 1510 and a positioning mechanism 1505. In some implementations, the positioning mechanism 1505 may limit the rotation of the latching mechanism 1510 to prevent or allow for locking. In some aspects, the positioning mechanism 1505 may be lifted to allow for the rotation of the latching mechanism 1510 onto the adjacent knob. In some embodiments, a locking mechanism 1500 may allow for locking of double doors, such as illustrated, or locking of a door to a door frame, not illustrated.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. An interchangeable pet door comprising:
    a first frame, wherein the first frame is configured to partially embed within a first external surface;
    a first connector, wherein the first connector is attached to the first frame to provide an interchangeable connection;
    an interchangeable hinge, wherein the interchangeable hinge is configured to pivot along a pivot axis defined by the first frame;
    a locking mechanism, wherein the locking mechanism is configured to secure a fixed interface between the interchangeable hinge and the first frame, the locking mechanism further comprising:
        a positioning mechanism, wherein the positioning mechanism limits the rotation of the interchangeable hinge to align with the pivot axis defined by the first frame and allow for locking;
        a latching mechanism, wherein the latching mechanism is configured to maintain the position of the interchangeable hinge and the first frame in a secured union;
    a door, wherein at least one edge connects to the interchangeable hinge;
    a second connector, wherein the second connector is a portion of the door that connects to the interchangeable hinge by connecting to the first connector;
    a knob, wherein the knob is attached to a surface of the door;

a latch, wherein the latch extends from a rotational axis of the knob and interfaces with the first frame;

a first connector frame extending from the first frame, wherein the first connector frame is configured to be fully embedded within the first external surface;

a second frame, wherein the second frame is configured to partially embed within a second external surface, wherein partially embedding the first frame within the first external service and partially embedding the second frame within the second external service forms a portal from the first external surface to the second external surface; and a second connector frame extending from the second frame, wherein the second connector frame is connectable on a distal end to the first connector frame.

2. The interchangeable pet door of claim 1, wherein the first frame comprises a hinge recess that secures the hinge in a plurality of predetermined positions.

3. The interchangeable pet door of claim 1, wherein the first connector comprises a recess into which the second connector is inserted.

4. The interchangeable pet door of claim 3, wherein the second connector comprises an extrusion which is inserted into the first connector.

5. The interchangeable pet door of claim 1, wherein the second connector comprises a recess into which the first connector is inserted.

6. The interchangeable pet door of claim 5, wherein the first connector comprises an extrusion which is inserted into the second connector.

7. The interchangeable pet door of claim 1, wherein the locking mechanism comprises two or more magnets.

8. The interchangeable pet door of claim 1, wherein the interchangeable hinge comprises a latch receiver configured to receive a latch extending from the door.

9. The interchangeable pet door of claim 8, wherein the latch receiver is internal to the first frame.

10. The interchangeable pet door of claim 8, wherein the latch receiver is external and attached to the first frame.

11. The interchangeable pet door of claim 1, wherein the door extends into a region between the first external surface and the second external surface.

12. The interchangeable pet door of claim 1, wherein the first frame or second frame, or both, comprises a sensor.

13. The interchangeable pet door of claim 12, wherein the sensor interacts with an external device.

14. The interchangeable pet door of claim 1, wherein the first external surface comprises a panel insertable proximate to a sliding glass door.

15. An interchangeable pet door comprising:
a first recessed frame, wherein the first recessed frame is configured to recess into a first external surface;
a first connector, wherein the first connector is attached to the first recessed frame to provide an interchangeable connection;
a first interchangeable hinge, wherein the interchangeable hinge pivots along a pivot axis defined by a first side of the first recessed frame;
a first locking mechanism, wherein the first locking mechanism is configured to secure a fixed interface between the first interchangeable hinge and the first recessed frame, the first locking mechanism further comprising:
a first positioning mechanism, wherein the first positioning mechanism limits the rotation of the first interchangeable hinge to align with the pivot axis defined by the first recessed frame and allow for locking;
a first latching mechanism, wherein the first latching mechanism is configured to maintain the position of the interchangeable hinge and the first recessed frame in a secured union;
a first door, wherein at least one edge connects to the first interchangeable hinge;
a second connector, wherein the second connector comprises a portion of the first door that connects to the interchangeable hinge by connecting to the first connector;
a first knob, wherein the first knob is attached to a surface of the first door;
a second interchangeable hinge, wherein the hinge pivots along a pivot axis defined by a second side of the first recessed frame;
a second door, wherein at least one edge connects to the second interchangeable hinge;
a second knob, wherein the second knob is attached to a surface of the second door;
a first connector frame, wherein the first connector frame is attached to the first recessed frame;
a second connector frame, wherein the second connector frame is configured to connect to the first connector frame; and
a second recessed frame configured to recess into a second external surface, wherein the second recessed frame extends distally from the second connector frame and wherein recession of the first recessed frame into the first external surface and recession of the second recessed frame into the second external surface forms a portal from the first external surface to the second external surface.

16. The interchangeable pet door of claim 15, further comprising:
a third connector, wherein the third connector is attached to the second interchangeable hinge to provide an interchangeable connection for the second door;
a second locking mechanism, wherein the second locking mechanism is configured to secure a fixed interface between the second interchangeable hinge and the second recessed frame, the second locking mechanism further comprising:
a second positioning mechanism, wherein the second positioning mechanism limits the rotation of the second interchangeable hinge to align with the pivot axis defined by the second recessed frame and allow for locking;
a second latching mechanism, wherein the second latching mechanism is configured to maintain the position of the interchangeable hinge and the second recessed frame in a secured union;
a fourth connector, wherein the fourth connector comprises a portion of the second door that connects to the second interchangeable hinge by connecting to the third connector.

17. The interchangeable pet door of claim 16, wherein the second positioning mechanism is configured to limit a position of the second latching mechanism, and wherein the latching mechanism is configured to interface with the second interchangeable hinge when in a locked position.

18. The interchangeable pet door of claim 15, wherein the first door and the second door extends into a region between the first external surface and the second external surface.

19. The interchangeable pet door of claim 18, wherein the first recessed frame or the second recessed frame, or both, comprises magnets for retaining one or both of the first door and the second door in a fixed position.

20. The interchangeable pet door of claim 15, further comprising an external device comprising a pressure sensor, wherein the external device controls a position of one or both of the first door and the second door.

\* \* \* \* \*